(12) United States Patent
Sonehara et al.

(10) Patent No.: US 6,633,930 B2
(45) Date of Patent: *Oct. 14, 2003

(54) INFORMATION PROCESSING APPARATUS, INFORMATION PROCESSING METHOD, AND INFORMATION PROVIDING MEDIUM

(75) Inventors: Takashi Sonehara, Nagano (JP); Katsuhiro Hashimoto, Kanagawa (JP); Yoshihiro Yamaguchi, Tokyo (JP); Yamamoto Ryou, Chiba (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/453,634

(22) Filed: Dec. 3, 1999

(65) Prior Publication Data

US 2003/0115384 A1 Jun. 19, 2003

(30) Foreign Application Priority Data

Dec. 4, 1998 (JP) .......................................... 10-345846
May 13, 1999 (JP) .......................................... 11-133369

(51) Int. Cl.[7] .............................................. G06F 13/12
(52) U.S. Cl. ..................... 710/62; 345/156; 345/163; 396/297
(58) Field of Search ................. 710/62, 72; 345/156, 345/163, 169; 396/297, 201

(56) References Cited

U.S. PATENT DOCUMENTS

| 5,243,376 A | * | 9/1993 | Yokonuma ................. 396/201 |
| 5,291,236 A | * | 3/1994 | Ohsawa et al. ............ 396/297 |
| 5,448,334 A | * | 9/1995 | Kaihara et al. ............ 396/297 |
| 5,530,455 A | * | 6/1996 | Gillick et al. ............. 345/156 |
| 5,563,631 A |   | 10/1996 | Masunaga ................. 345/169 |
| 5,825,353 A | * | 10/1998 | Will ....................... 345/184 |
| 6,166,721 A | * | 12/2000 | Kuroiwa et al. ........... 345/163 |
| 6,201,524 B1 | * | 3/2001 | Aizawa ..................... 345/169 |

FOREIGN PATENT DOCUMENTS

EP  0 588 210  3/1994

* cited by examiner

Primary Examiner—Jeffrey Gaffin
Assistant Examiner—Harold Kim
(74) Attorney, Agent, or Firm—Frommer Lawrence & Haug LLP; William S. Frommer

(57) ABSTRACT

Disclosed herein are an information processing apparatus, an information processing method, and information providing medium, more particularly, the present invention provides an information processing apparatus having a first executing means for executing a predetermined processing in response to a rotational operation; and a second executing means for executing another predetermined processing in response to a pushing operation. Accordingly, repeated, complicated operations required in a related art operating systems to select a desired application program on a taskbar having a start menu button to activating the selected application program is eliminated.

14 Claims, 21 Drawing Sheets

INFORMATION PROCESSING APPARATUS, INFORMATION PROCESSING METHOD, AND INFORMATION PROVIDING MEDIUM

BACKGROUND OF THE INVENTION

The present invention relates generally to an information processing apparatus, an information processing method, and an information providing medium and, more particularly, to an information processing apparatus, an information processing method, and an information providing medium that are capable of executing predetermined processing by a simple operation.

For personal computer (PC) operating systems such as Microsoft Windows 95 (trademark) and Microsoft Windows 98 (trademark), systems that provides a taskbar for providing graphical user interfaces such as buttons for application programs having an active window have come into wide use. A technology associated with a taskbar is disclosed in detail in Japanese Patent Application Laid-open No. Hei 8-255066.

The following describes a taskbar with reference to the above-mentioned patent application. A taskbar provides users information about a currently active window as a visual notice in operating software programs. At the same time, a taskbar can be used to display the associated active window itself. A taskbar may have a start menu button that allows a user to access a menu for a program launching operation, a document open operation, a system setting operation, and other control operations.

The following describes an example in which the start menu button as described above is operated in a computer system having peripheral devices such as a mouse, a keyboard, and a video display unit and a central processing unit (CPU). The start menu button functions as means for opening a start menu that operates as the center stage for a user to access a program, a document, system settings, and help information, for example. When the user places the mouse cursor on the start menu and clicks the left button on the mouse, the start menu is displayed.

The start menu has such menu items as "Program," "Search," "Setting," and "Help", for example. The "Program" menu item allows the user to access from the start menu to the hierarchically displayed program menu. The program menu displays two or more application programs and program groups selectable by the user.

It should be noted here that complicated operations must be repeated by the user to select a desired application program on a taskbar having the above-mentioned start menu and to start the selected application program.

Namely, the user first points with the mouse cursor the start menu button on the taskbar and clicks the left button on the mouse for displaying the start menu. Then, the user points the "Program" menu item thereof to display the program menu. Next, the user points a desired application program shown on the program menu and clicks the left button on the mouse. In the case of an application program group, the user must repeat the pointing and clicking operation until the desired program is reached. When the user specifies by clicking a desired application program, the CPU starts it.

Thus, to start a desired application program, the user must repeat cumbersome operations, thereby deteriorating the convenience of the user interface. This holds true with a situation in which the user clicks a menu item such as "Help" for example from the start menu program to execute desired processing.

SUMMARY OF THE INVENTION

It is therefore an object of the present invention to provide an information processing apparatus, an information processing method, and an information providing medium that allow users to execute desired processing by a simple operation using a rotary-type dial for example.

In carrying out the invention and according to a first aspect thereof, there is provided an information processing apparatus including a first executing means for executing a predetermined processing in response to a rotational operation; and a second executing means for executing another predetermined processing in response to a pushing operation.

In carrying out the invention and according to a second aspect thereof, there is provided an information processing apparatus including an operating means having a first operating block corresponding to a rotational operation and a second operating block corresponding to a pushing operation; and a control means for monitoring an operating state of the operating means and executing a predetermined processing in response to each of the rotational operation and the pushing operation.

In carrying out the invention and according to a third aspect thereof, there is provided an information processing method including a first executing step for executing a predetermined processing in response to a rotational operation; and a second executing step for executing another predetermined processing in response to a pushing operation.

In carrying out the invention and according to a fourth aspect thereof, there is provided an information processing method including a control step for monitoring an operation state of an operating means having a first operating block corresponding to a rotational operation and a second operating block corresponding to a pushing operation and executing a predetermined processing corresponding to each of the rotational operation and the pushing operation.

In carrying out the invention and according to a fifth aspect thereof, there is provided an information providing medium for making an information processing apparatus execute a computer program including a first executing step for executing a predetermined processing in response to a rotational operation and a second executing step for executing another predetermined processing in response to a pushing operation.

In carrying out the invention and according to a sixth aspect thereof, there is provided an information providing medium for making an information processing apparatus execute a computer program including a control step for monitoring an operation state of an operating means having a first operating block corresponding to a rotational operation and a second operating block corresponding to a pushing operation and executing a predetermined processing corresponding to each of the rotational operation and the pushing operation.

BRIEF DESCRIPTION OF THE DRAWINGS

These and other objects of the invention will be seen by reference to the description, taken in connection with the accompanying drawing, in which:

FIG. 16 is a flowchart indicative of the processing of the jog dial state monitor program to be executed by the CPU of the note-type personal computer shown in FIG. 1 when its power switch is turned on;

DETAILED DESCRIPTION OF PREFERRED EMBODIMENTS

Preferred embodiments of this invention will now be described with reference to the accompanying drawings.

Figure 1:
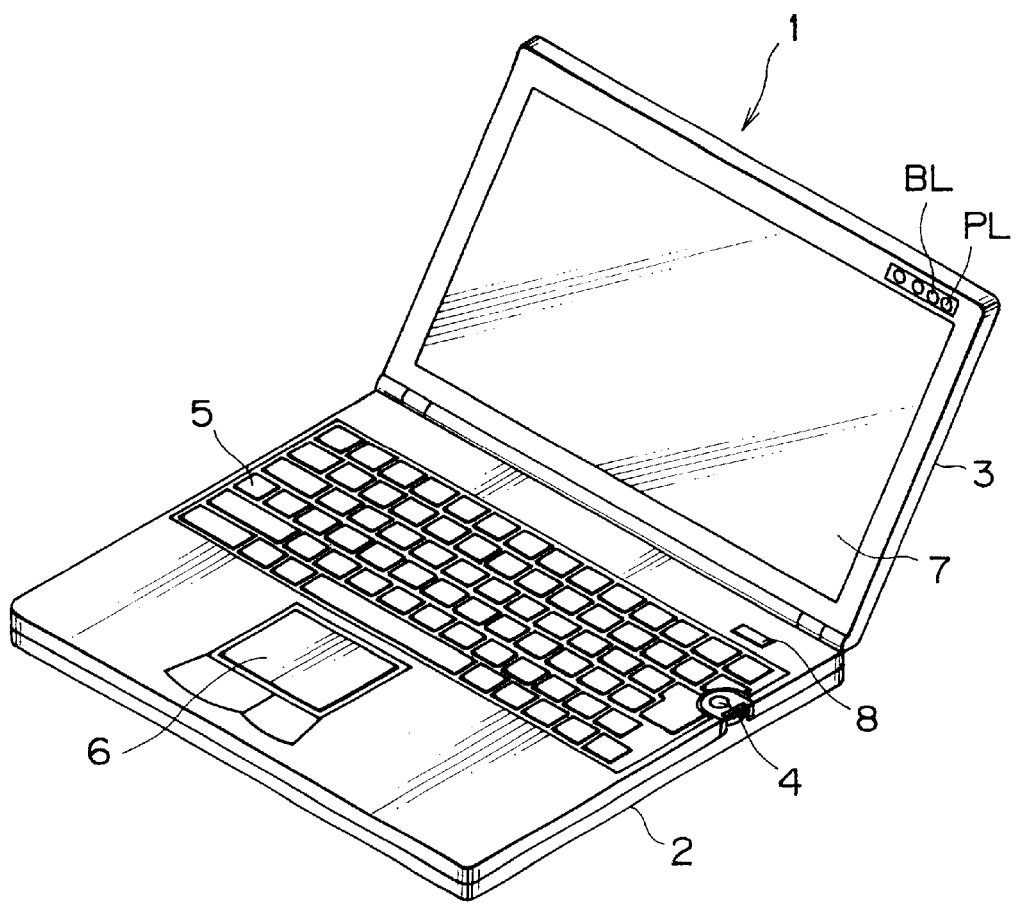
FIG. 1 is an external perspective view illustrating a note-type personal computer to which the present invention is applied.
Figure 2:
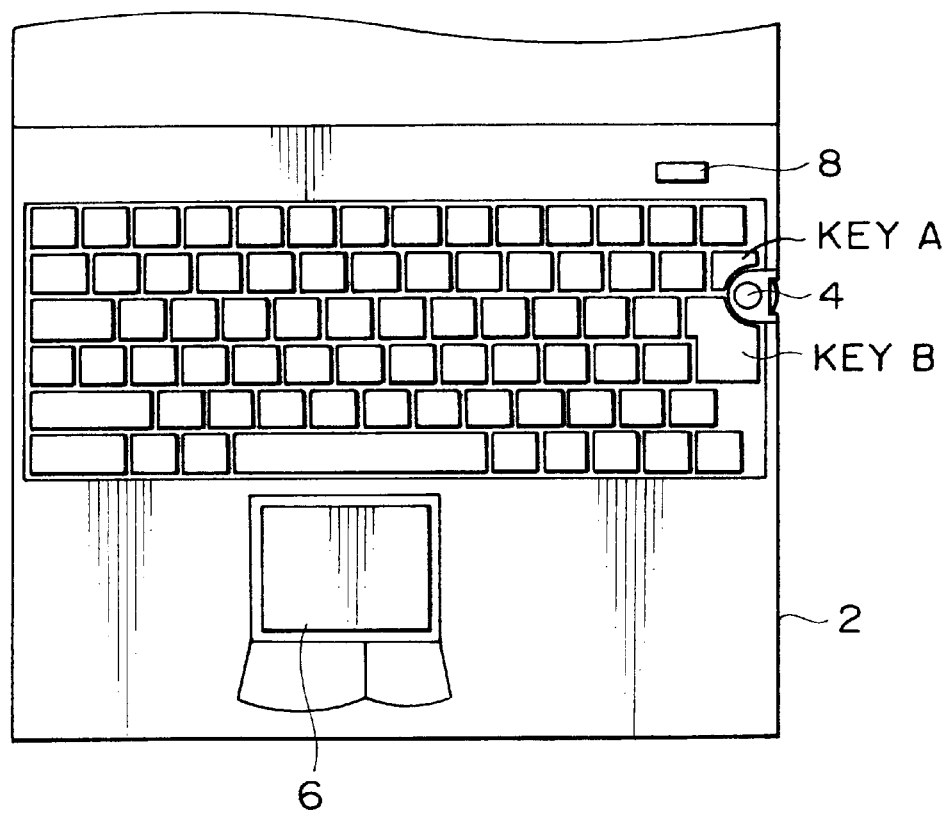
FIG. 2 is a top view illustrating the main frame of the note-type personal computer shown in FIG. 1.
Figure 3:
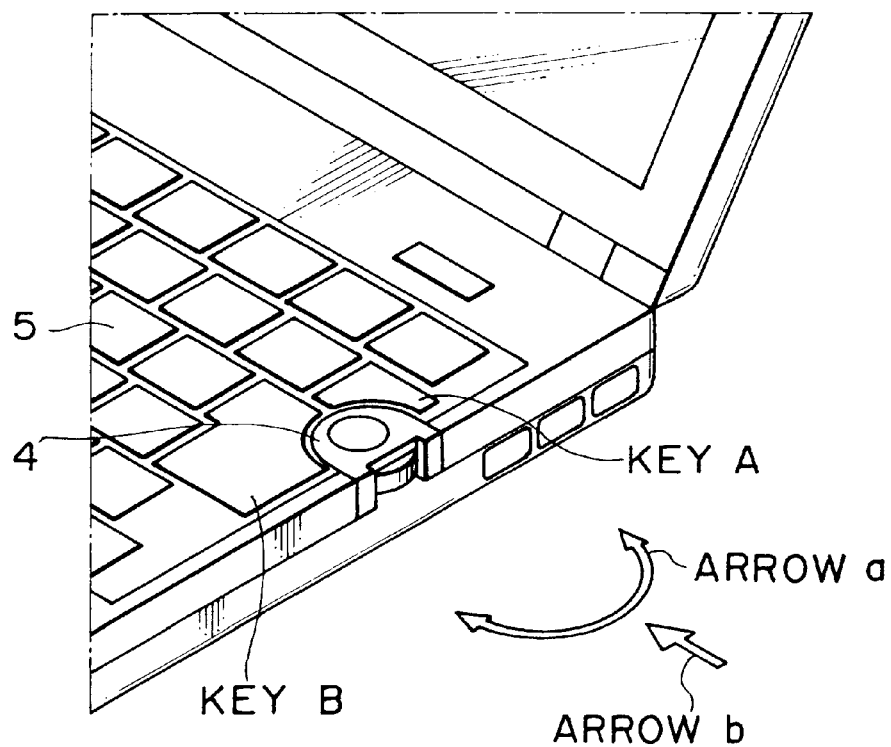
FIG. 3 is an expanded perspective view illustrating the surroundings of a jog dial that forms the main portion of the present invention.
Figure 4:
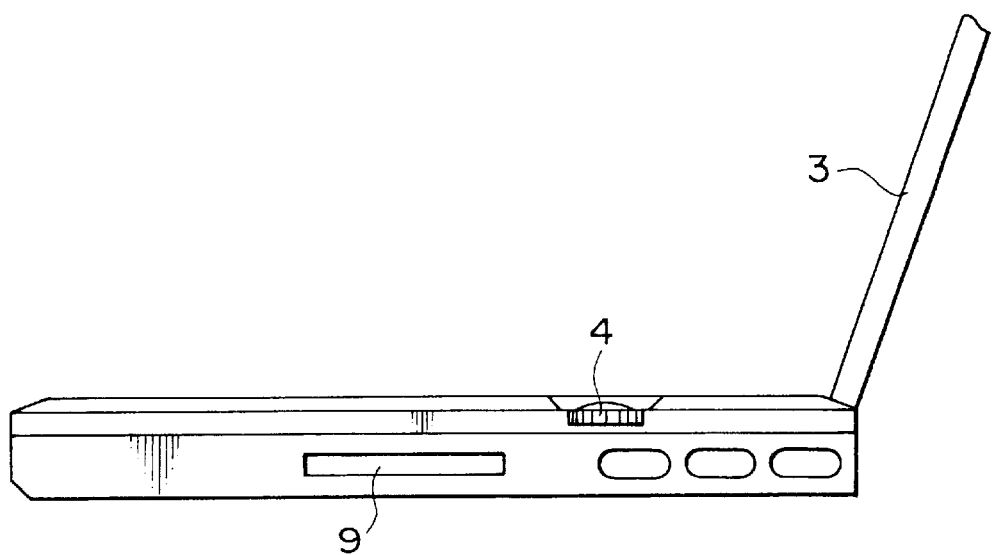
FIG. 4 is a side view illustrating the main frame as viewed from the side of the jog dial.

Now, referring to FIGS. 1 through 4, there are shown external views of a note-type personal computer as one example to which an information processing apparatus, an information processing method, and an information providing medium according to the present invention are applied. The note-type personal computer 1 is basically made up of a main frame 2 and a display unit 3 pivotally attached to the main frame. FIG. 1 is an external perspective view in which the display unit 3 is open relative to the main frame 2. FIG. 2 shows a top view of the main frame 2. FIG. 3 shows an enlarged view of the surroundings of a jog dial 4 which forms the main portion of the present invention. FIG. 4 is a side view of the main frame 2 as viewed from the side of the jog dial 4. It should be noted that the jog dial 4 is one of rotary-type dials.

The main frame 2 is arranged on the top surface thereof with a keyboard 5 through which a user inputs various characters and symbols, a touch pad 6 for use as a pointing device by means of which the user moves the mouse cursor, and a power switch 8.

The display unit 3 is arranged on the front side thereof with an LCD (Liquid Crystal Display) 7 for displaying images. In addition, the display unit 3 is arranged in the upper right corner thereof with a power lamp PL, a battery lamp BL, a message lamp ML as required, and other LED (Light Emitting Diode) lights.

The jog dial 4 is provided between a key A and a key B (rightmost keys) of the keyboard 5 on the main frame 2 and is generally flush with these keys.

The jog dial 4 executes predetermined processing according to the rotary operation denoted by arrow "a" and the moving operation denoted by arrow "b" shown in. FIG. 3. The predetermined processing to be executed by the jog dial 4 will be described later.

First, the configuration of the jog dial 4 is described below. The jog dial 4 is an embodiment of the rotary-operation type electronic component with a push switch disclosed in Japanese Patent Application Laid-open No. Hei 8-203387 filed by the joint applicant of the applicant hereof and the applicant hereof.

Figure 5:
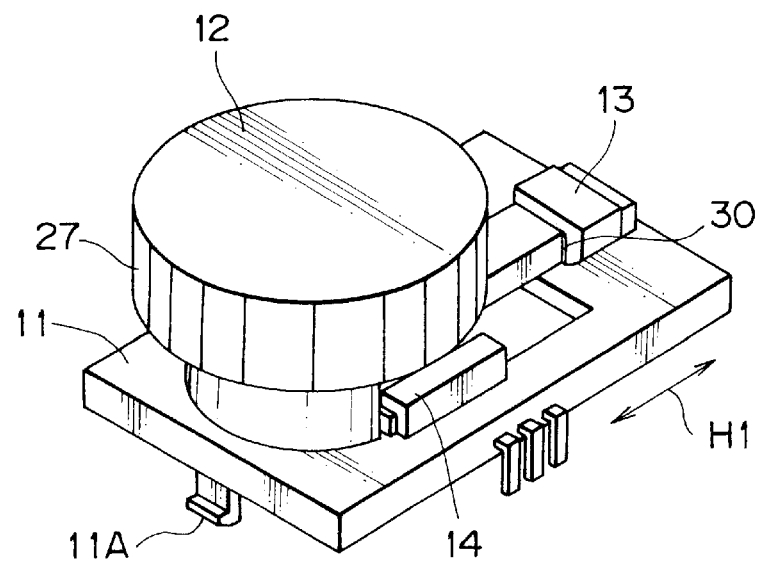
FIG. 5 is an external perspective view illustrating the jog dial.

To be more specific, as shown in FIG. 5, the jog dial 4 is composed of a contact mounting board 11 and a rotary encoder 12 and a push switch 13 which are arranged on the contact mounting board 11. The rotary encoder 12 is adapted to be horizontally movable within a certain range but the push switch 13 is firmly fixed thereon.

Figure 6:
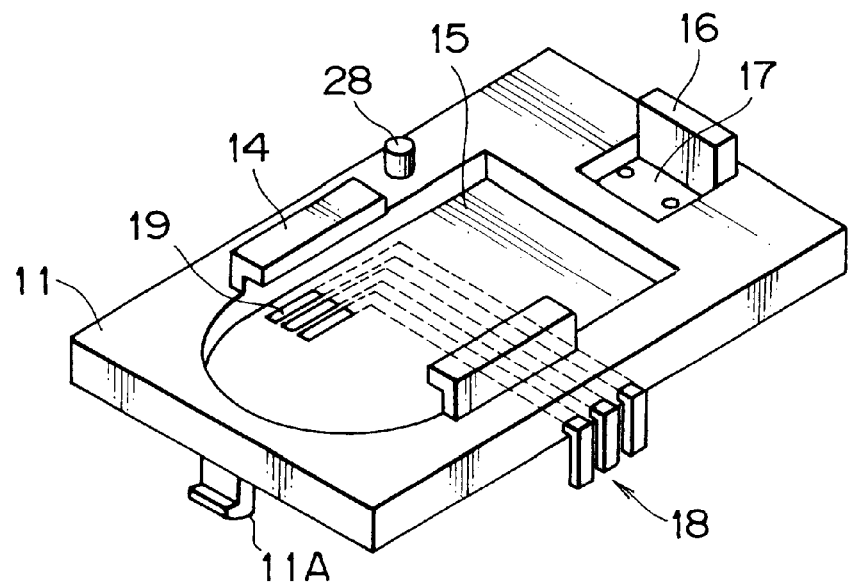
FIG. 6 is a perspective view illustrating the contact mounting board that forms the main portion of the jog dial shown in FIG. 5.

As shown in FIG. 6, the contact mounting board 11 formed by a flat mold resin body has a recess 15 having a guide rail 14 for movably guiding the rotary encoder 12, a recess 17 having a stopper wall 16 for fixing the push switch 13, and a contact plate 19 having a terminal 18 for transmitting an electrical signal from the rotary encoder 12 to the outside.

Figure 7:
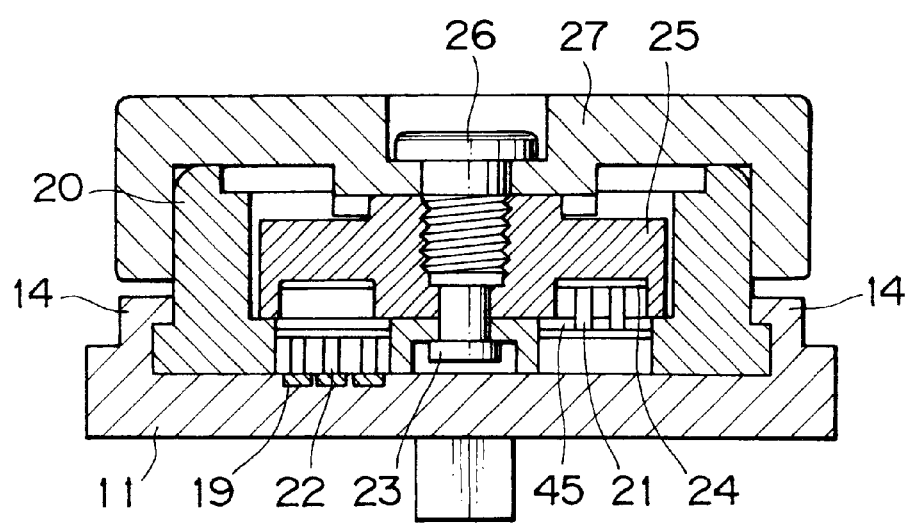
FIG. 7 is a front cross section illustrating the above-mentioned jog dial.
Figure 8:
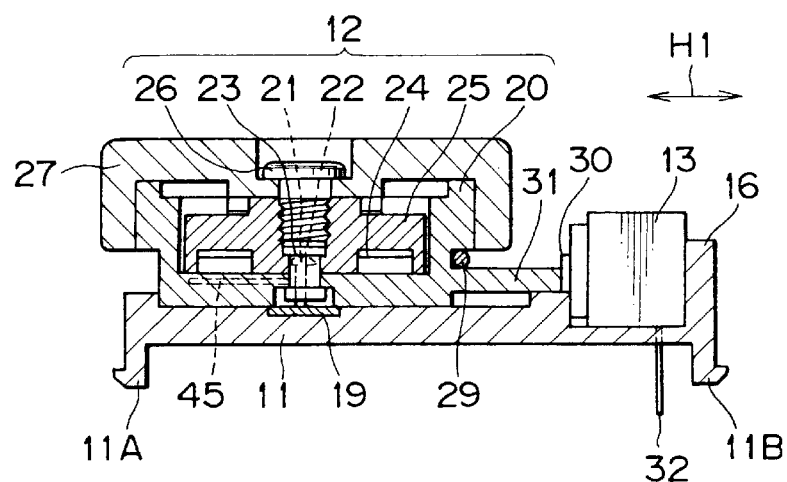
FIG. 8 is a side cross section illustrating the above-mentioned jog dial.

As shown in FIGS. 7 and 8, the rotary encoder 12 is composed of a mold resin box case 20 inserted in the recess 15 and held to be horizontally movable (in the direction denoted by arrow H1 shown in FIGS. 5 and 8) within a certain range along the guide rail 14, elastic contact legs 21 and 22 projecting upward and downward respectively from an elastic contact body 45 attached to the bottom of the box case 20 in an insertion molding technique, a mold resin rotary body 25 rotationally held by a cylinder axis 23 integrally formed with the box case 20 at its center and having a disc radial contact plate 24 with the elastic contact leg 21 pressed against the lower surface thereof, and a disc-shaped operation knob 27 of periphery operating type mounted on the rotary body 25 with a screw 26 such that the rotary body 25 can be operated by rotating the operation knob 27. In this arrangement, a twisted coil spring 29 positioned by a pin projection 28 (refer to FIGS. 6 and 10) disposed on the contact mounting board 11 horizontally urges the box case 20 at one side thereof such that the box case 20 is normally located away from the push switch 13. At the same time, the elastic contact leg 22 projecting downward from the bottom of the box case 20 is pressed against the contact plate 19 of the contact mounting board 11.

As shown in FIGS. 5 and 6, the push switch 13 is engaged in the recess 17 of the contact mounting board 11 and fixed thereto such that an operation button 30 is opposed to the rotary encoder 12 with the rear end of the operation button 30 abutting against the stopper wall 16.

Figure 9:
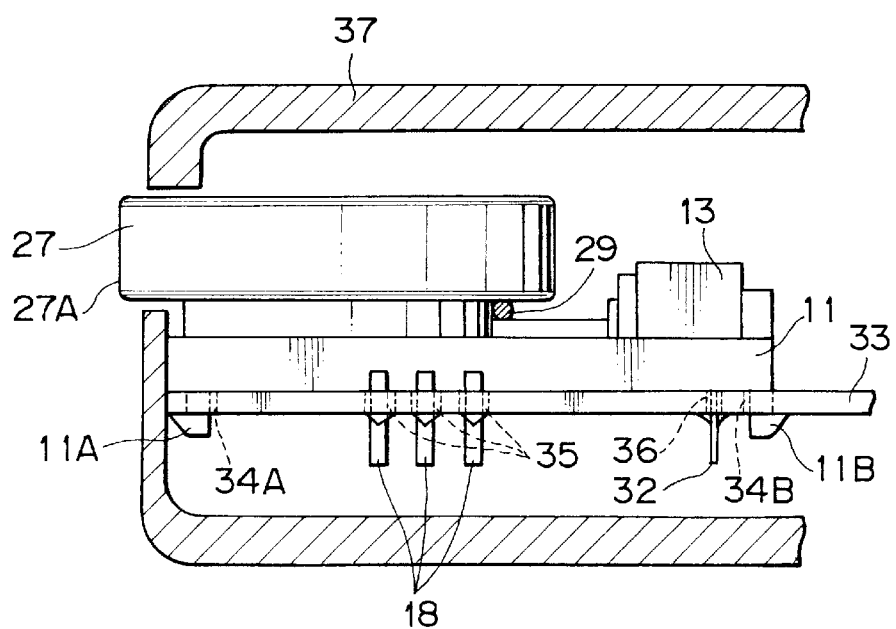
FIG. 9 is a side view illustrating the above-mentioned jog dial as mounted on an apparatus used.

As shown in FIG. 8, a driving projection 31 arranged integrally with the box case 20 of the rotary encoder 12 abuts against the tip of the operation button 30 of the push switch 13. The jog dial thus constituted is mounted on electronic apparatus as follows. Referring to FIG. 9, legs 11A and 11B provided beneath the contact mounting board 11, the connection terminal 18 of the rotary encoder 12, and a connection terminal 32 of the push switch 13 are inserted in mounting holes 34A, 34B, 35, and 36 respectively and soldered therein. Thus, the jog dial is arranged so that the disk-shape operation knob 27 of the rotary encoder 12 partially projects from the clearance of a casing 37 of the electronic apparatus, the clearance being opposed to the push switch 13.

The following describes the operation of the jog dial 4. First, referring to FIGS. 9 and 10, when the user rotates the operation knob 27 at its projected portion 27A from the case 37, the rotary body 25 rotates around the cylinder axis 23 located at the center of the box case 20. This makes the upward elastic contact leg 21 slide on the radial contact plate 24 below the rotary body 25. At the contact portion therebetween, a pulse signal is generated according to the rotary operation of the operation knob 27.

The pulse signal thus generated is transmitted from the upward elastic contact leg 21 to the downward elastic contact leg 22 and then to the contact plate 19 on the contact mounting board 11 to which the elastic contact leg 22 is pressed. The pulse signal is eventually transmitted to a printed circuit board 33 of the electronic apparatus through the terminal 18 for external connection.

Figure 11:
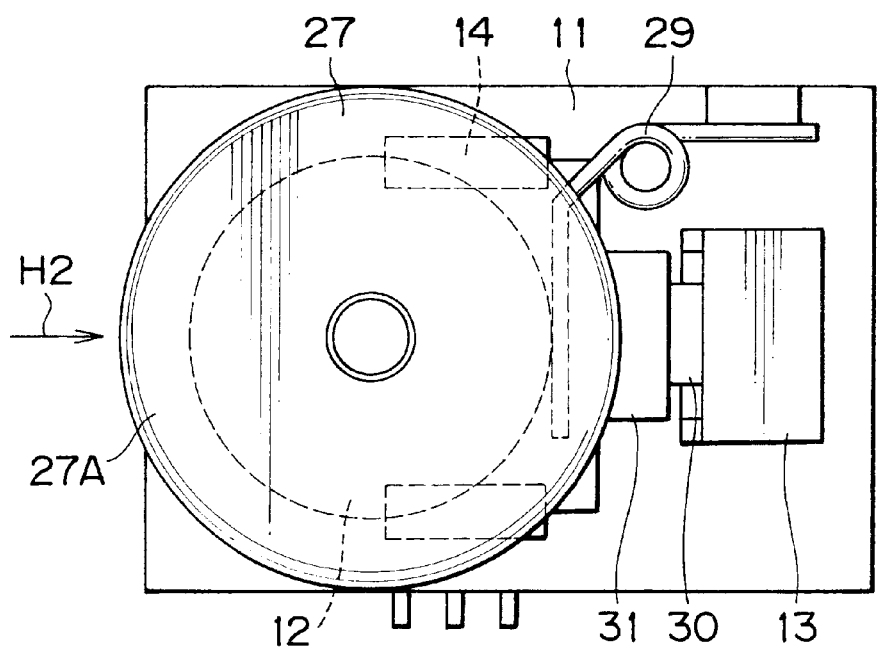
FIG. 11 is a top view for describing the push switch of the above-mentioned jog dial.

Referring to FIG. 11, when the user pushes the projected portion 27A of the operation knob 27 against the pressing energy of the twisted coil spring 29 on the contact mounting board 11 in the direction indicated by arrow H2, the entire rotary encoder 12 moves horizontally along the guide rail 14 toward the push button 13 via the projection 31 arranged on the box case 20, thereby pressing the push switch 13 for operation. A signal generated by this operation is transmitted to the printed circuit board 33 through the connection terminal 32 as shown in FIG. 9.

Figure 10:
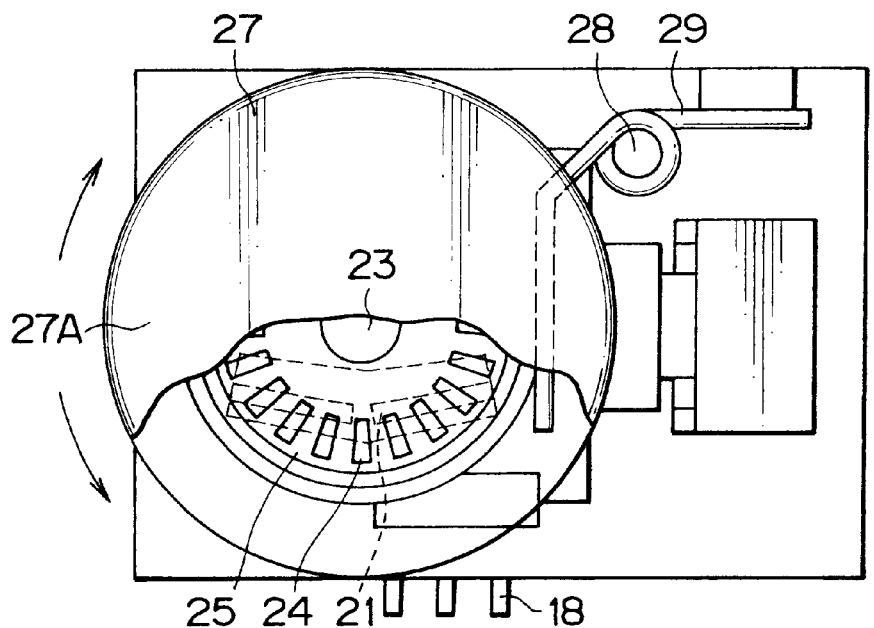
FIG. 10 is a partial cutaway view illustrating the rotary encoder that forms the above-mentioned jog dial.

When the user releases the operation knob 27, the twisted coil spring 29 presses back the rotary encoder 12 to the original position shown in FIG. 10.

In the above-mentioned example, the electrical signals generated in the rotary encoder 12 are transmitted to the connection terminal 18 of the contact mounting board 11 in the configuration in which the elastic contact leg 22 projecting downward from the bottom of the box case 20 of the rotary encoder 12 is pressed to the contact plate 19 of the contact mounting board 11. It will be apparent that the signal transmission is also achieved by extending the elastic contact leg from the contact mounting board 11 to press the contact leg against the contact plate on the bottom of the box case 20. So far mentioned is the explanation of how is operated the jog dial with the above configuration.

It will also be apparent to those skilled in the art that the jog dial 4 may be arranged on the left side of the main frame 2. It will also be apparent that the jog dial 4 may be arranged at the center of the main frame 2 so that the user can operate the jog dial while operating the touch pad 6 with her/his index finger. It will be apparent that the jog dial 4 may be arranged on the left or right side end of the display unit 3 on which the LCD 7 is arranged. Further, it will be apparent that the jog dial 4 may be arranged vertically along the left end or right end rim of the touch pad 6. It will be apparent that the jog dial 4 may be arranged horizontally along the upper end or lower end rim of the touch pad 6. It will be apparent that the jog dial 4 may be arranged vertically between the right button and the left button of the touch pad 6. It will be apparent that the jog dial 4 may be arranged vertically between "G" key and "H" key of the keyboard 5. It will be apparent that the jog dial 4 may not be limited to be arranged in the vertical or horizontal direction, but may be arranged at any easy-to-operate angles determined by considering the movement of fingers upon typing the keyboard. Furthermore it will be apparent that the jog dial 4 may be arranged on the mouse serving as a pointing device at one side thereof at which the jog dial 4 is operable with a thumb of the user.

Figure 12:
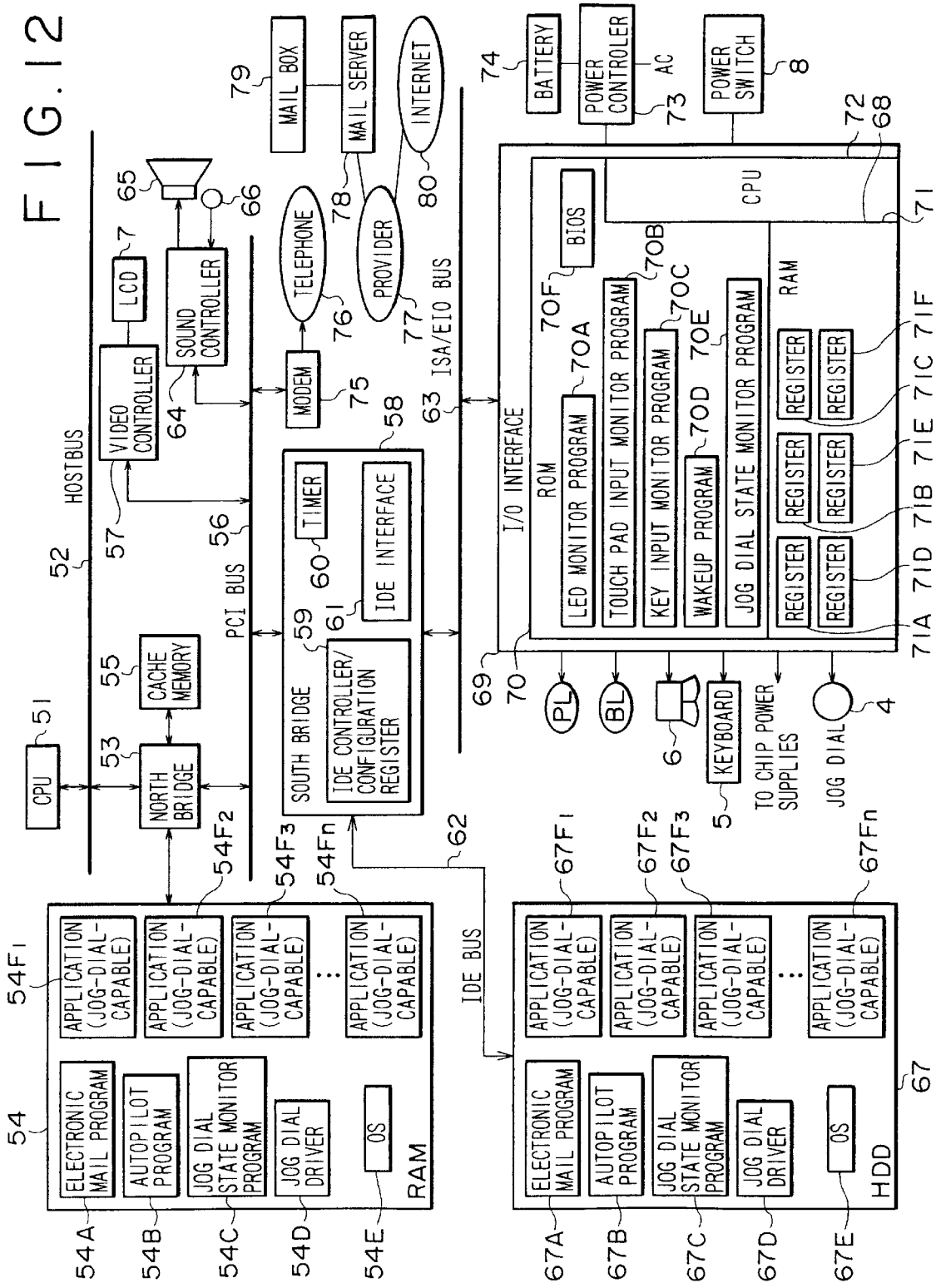
FIG. 12 is an electrical circuit diagram illustrating the note-type personal computer shown in FIG. 1.

The following describes one example of the electrical configuration of the note-type personal computer 1 with reference to FIG. 12. A CPU (Central Processing Unit) 51 is constituted typically by the Pentium (trademark) processor of Intel Corporation and connected to a host bus 52. The host bus 52 is connected to a north bridge 53, which is connected to a PCI (Peripheral Component Interconnect) bus 56. The north bridge 53 is constituted typically by the 440BX of Intel Corporation and is adapted to control the CPU 51, a memory 54, and so on. It should be noted that this north bridge 53 and a south bridge 58 to be described later constitutes a so-called chip set.

The north bridge 53 is also connected to a main memory 54 and a cache memory 55. The cache memory 55 caches data to be used by the CPU 51. Although not shown, the CPU 51 incorporates a primary cache memory.

The main memory 54 is constituted by a DRAM (Dynamic Random Access Memory) for example and stores programs to be executed by the CPU 51 and data necessary for the CPU 51 for operation. To be more specific, the main memory 54 stores, at the time starting of the personal computer 1 has been completed, an electronic mail program 54A, an autopilot program 54B, a jog dial state monitor program 54C, a jog dial driver 54D, an operating system (OS) 54E, and other application programs 54F1 through 54Fn loaded from a HDD (Hard Disk Drive) 70.

The electronic mail program 54A sends and receives electronic mail via a network through a modem 75 to be described later and a public telephone line 76. The electronic mail program 54A has an incoming mail acquisition capability as a specific capability. This incoming mail acquisition capability checks a mail box 79 in a mail server 78 of an Internet service provider 77 for a mail addressed to the user. If the mail is found, the incoming mail acquisition capability executes the processing for acquiring it.

The autopilot program 54B starts a plurality of preset processing (or programs) in a predetermined sequence for processing.

The OS 54E, which is an operating system typified by Windows 95 (trademark) and Windows 98 (trademark) of Microsoft Corporation and the Mac OS (trademark) of Apple Computer, Inc., controls the basic operations of the computer.

The jog dial state monitor program 54C receives information as to whether each of the above-mentioned application programs is jog-dial-capable or not. If a particular application program is found jog-dial-capable, the jog dial state monitor program 54C displays what can be executed by operating the jog dial 4. Normally, this program is waiting for an event generated by the jog dial 4. In addition, this program has a list for receiving information from the application programs. The jog dial driver 54D executes various functions in accordance with the operation executed on the jog dial 4.

A video controller 57 is connected to the PCI bus 56. On the basis of data supplied through the PCI bus 56, the video controller 57 controls the display operation of the LCD 7 of the display unit 3.

The PCI bus 56 is connected to a sound controller 64, which captures the input of a microphone 66 or supplies an audio signal to a speaker 65. The PCI bus 56 is also connected to the modem 75 mentioned above. The modem 75 allows the personal computer 1 to connect to a communication network 80 such as the Internet and the mail server 78 through the public telephone line 76 and the Internet service provider 77.

The PCI bus 56 is also connected to a south bridge 58. The south bridge 58 is constituted by PIIX4E of Intel Corporation for example and controls various I/O (Input/Output) operations. To be more specific, the south bridge 58, composed of an IDE (Integrated Drive Electronics) controller/configuration register 59, a timer 60, and an IDE interface 61, controls devices connected to the IDE bus and devices connected through an ISA/EIO (Industry Standard Architecture/Extended Input Output) bus 63 and an embedded controller 68.

The IDE controller/configuration register 59 is composed of two IDE controllers, which are so-called primary and secondary IDE controllers, and a configuration register (these IDE controllers and a configuration register are not shown in the figure).

The primary IDE controller is connected to a connector (not shown) through the IDE bus 62. The connector is connected to the HDD 67. The secondary IDE controller is connected electrically to the connectors of bay devices upon installation, which are IDE devices such as a CD-ROM (Compact Disc ROM) drive, a second HDD, and a second FDD (Floppy Disc Drive).

As described above, the HDD 67 stores a plurality of application programs 67F1 through 67Fn in addition to the electronic mail program 67A, the autopilot program 67B, the jog dial state monitor program 67C, the jog dial driver 67D, and the OS 67E. These programs 67A through 67Fn are sequentially loaded into the RAM 54 during starting (boot) processing.

The ISA/EIO bus 63 is also connected to the embedded controller 68, which is a microcontroller serving as an I/O controller. To be more specific, the embedded controller 68 is composed of an I/O interface 69, a ROM 70, a RAM 71, and a CPU 72 connected to each other.

The ROM 70 stores a LED control program 70A, a touch pad input monitor program 70B, a key input monitor program 70C, a wakeup program 70D, and a jog dial state monitor program 70E in advance.

The LED control program 70A controls the operations of a power lamp PL, a buttery lamp BL, a message lamp ML as required, and other LED lamps. The touch pad input monitor program 70B monitors the inputs made by the user operating the touch pad 6. The key input monitor program 70C monitors the inputs by the user operating the keyboard 5 and other key switches;. The wakeup program 70D checks whether a preset time has been reached on the basis of the current time supplied from the timer 60 in the south bridge 58. If the preset time is found reached, the wakeup program 70D controls each of chip power supplies, thereby starting the predetermined processing (or predetermined programs) at the preset time.

The jog dial state monitor program 70E always monitors whether the rotary encoder 12 of the jog dial 4 has been either rotated or pushed. This program 70 will be described in detail later.

The ROM 70 also stores a BIOS (Basic Input/Output System) 70F. The BIOS is the software, which controls the data transfer (or input/output) between the OS and application programs and peripheral devices (the display unit, the keyboard, and the HDD among others).

The RAM 71 has registers 71A through 71F, each serving as a register for LED control, touch pad input status, key input status, and setting time and the I/O register for jog dial state monitoring. For example, the LED control register 71A controls the turn-on/-off of the message lamp ML indicative of the instantaneous start state of electronic mail program to be described later after pressing the jog dial 4. The key input status register 71C stores an operation key flag when the jog dial 4 is pressed for a single-touch operation to be described later. The setting time register 71D sets a time as desired.

The embedded controller 68 is also connected to the jog dial 4, the touch pad 6, and the keyboard 5 through connectors, not shown. The embedded controller 68 outputs the signals generated in accordance with the operations of the jog dial 4, the touch pad 6, and the keyboard 5 to the ISA/EIO bus 63. The embedded controller 68 is further connected to the power lamp PL, the battery lamp BL, the message lamp ML, and other LED lamps.

The embedded controller 68 is still further connected to a power supply controller 73. The power supply controller 73, connected to an incorporated battery 74 or an AC power supply, supplies necessary powers to the component blocks of the system and controls the charging of the incorporated battery 74 and the second batteries of peripheral devices. The embedded controller 68 also monitors the power switch which is operated to turn on/off the power to the system.

Even if the power switch 8 is turned off, the embedded controller 68 can always execute the above-mentioned programs 70A, 70B, 70C, 70D, and 70E by means of the internal power supply. Namely, these programs are always running, even if nothing is displayed on the LCD 7 of the display unit 3. This indicates that the embedded controller 68, if the power switch is turned off and the OS 54E has not been started by the CPU 51, always executes the jog dial state monitor program 70E. Thus, though omitting details, without arranging a dedicated key on the note-type personal computer 1, a programmable power key (PPK) capability which allows the user to start a desired software and script files only by pressing the jog dial 4 when the system is in the power saving mode or power-off state is imparted thereto.

Figure 13:
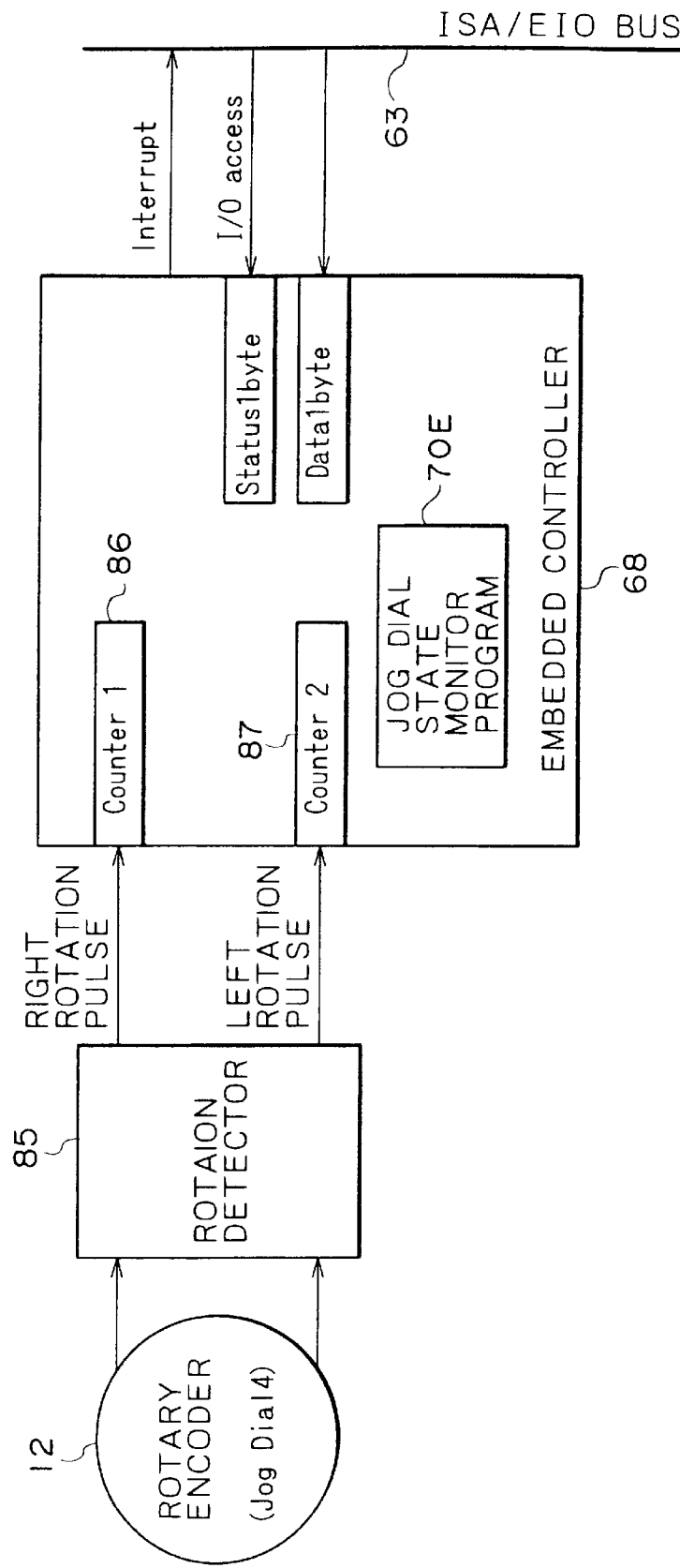
FIG. 13 is a diagram illustrating the hardware configuration in which an embedded controller monitors through a rotation detector the rotary encoder of the above-mentioned jog dial.
Figure 14:
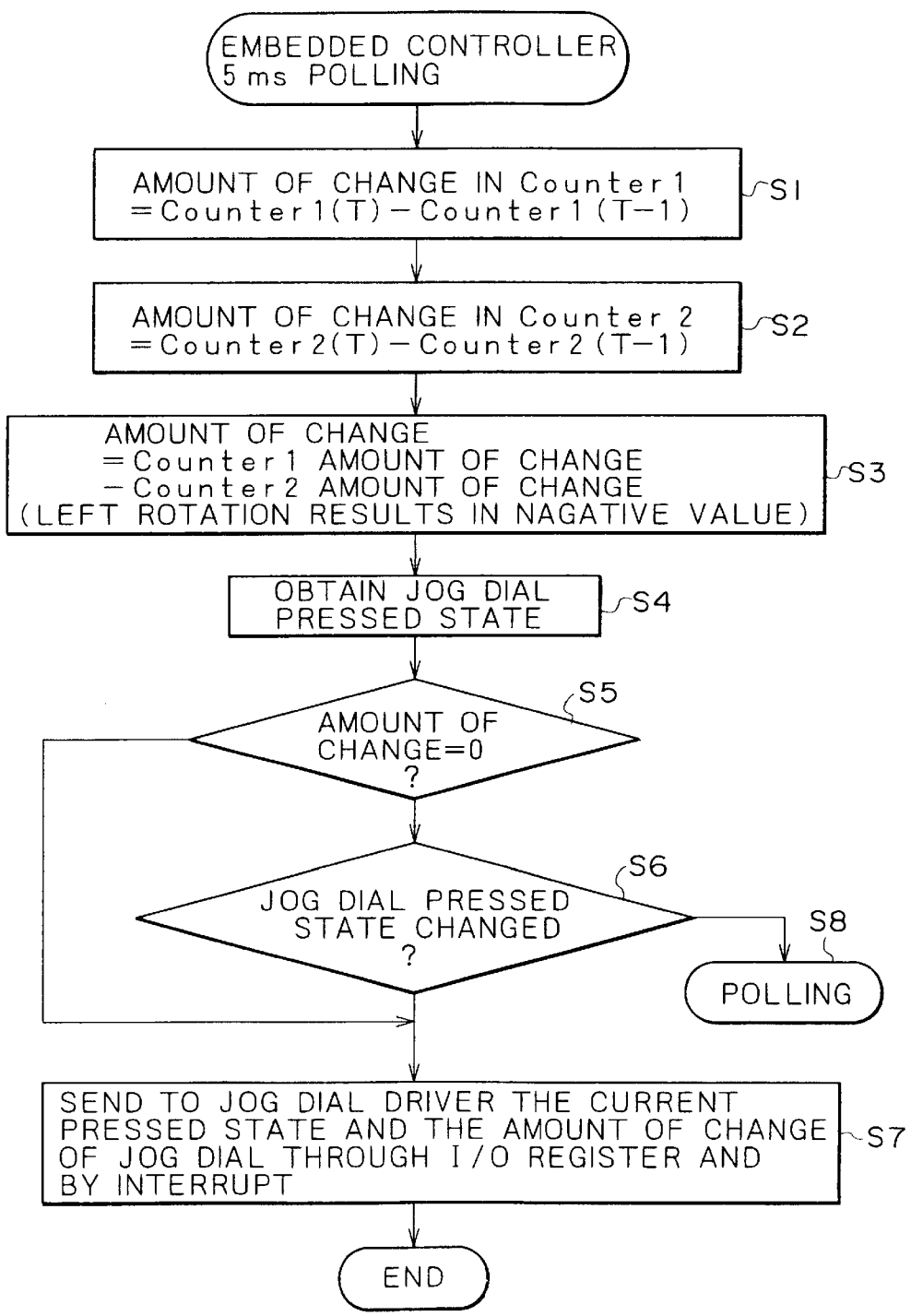
FIG. 14 is a flowchart indicative of the execution by the embedded controller of a jog dial state monitor program.
Figure 15:
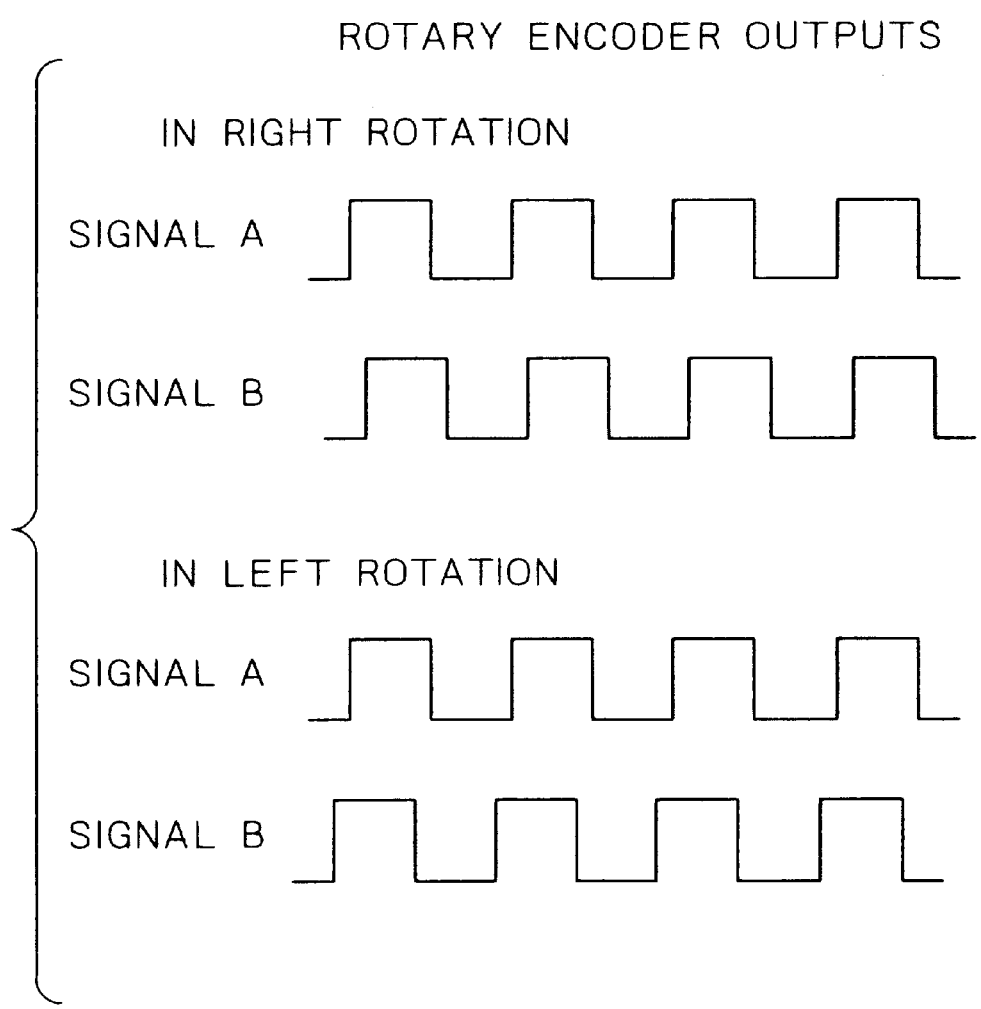
FIG. 15 is a timing chart illustrating the operation of the rotation detector shown in FIG. 13.

The following describes the operation of the embedded controller 68 to be executed when the jog dial state monitor program 70E is executed with reference to FIGS. 13 through 15. FIG. 13 shows the hardware configuration in which the embedded controller 68 monitors the state of the rotary encoder 12 of the jog dial 4 through a rotation detector 85. FIG. 14 is a flowchart indicative of the execution by the embedded controller 68 of the jog dial state monitor program 70E. FIG. 15 is a timing chart indicative of the operation of the rotation detector 85 shown in FIG. 13.

First, when the rotary encoder 12 of the jog dial 4 is rotated either left or right, the rotation detector 85 detects the rotational direction on the basis of the timings of a signal A and a signal B shown in FIG. 15. If the rotation is found in the right direction, the rotation detector 85 supplies a right-rotation pulse to a counter(1) 86 of the embedded controller 68. If the rotation is found in the left direction, the rotation detector 85 supplies a left-rotation pulse to a counter(2) 87 of the embedded controller 68.

Based on the supplied pulse, the embedded controller 68 executes the jog dial state monitor program 70E to monitor by 5ms-polling the amounts of change in the counter(l) 86 and the counter(2) 87, the difference between these amounts, and whether or not pressing the jog dial 4.

Referring to FIG. 14, a count value Counter1(T-1) obtained at time T-1 is subtracted from a count value Counter1(T) obtained at current time T of a right-rotation pulse to obtain the amount of change Counter1 in the count value of the counter 78 in step S1.

In step S2, the count value Counter1(T-1) at time T-1 is subtracted from a count value Counter1(T) at current time T of a left-rotation pulse to obtain the amount of change Counter2 in the count value of the counter 87.

In step S3, the difference between the amounts of change in the count values, namely the difference between the amount of change Counter1 and the amount of change Counter2 is obtained. If the difference is found a negative value, it indicates that the jog dial 4 is rotated leftward.

In step S4, the embedded controller 68 obtains the state of pressing of the jog dial 4. In step S5, the embedded controller 68 determines the difference in the amount of change obtained in step S3. In step S6, the embedded controller 68 determines whether the state of pressing of the jog dial 4 has been changed or not. If the difference in the amount of change is found in step S5, or if found the pressing state is changed in step S6, then, in step S7, the embedded controller 68 sends, over the host bus 52, to the jog dial driver 54D to be started by the CPU 51, the current push state and the amount of change of the jog dial 4 through the I/O register 71F by causing an interrupt.

If no change is found in the pressing state of the jog dial 4 in step S6, then, in step S8, the embedded controller 68 ends polling and repeats the processing from Si onward by 5ms polling.

Figure 16:
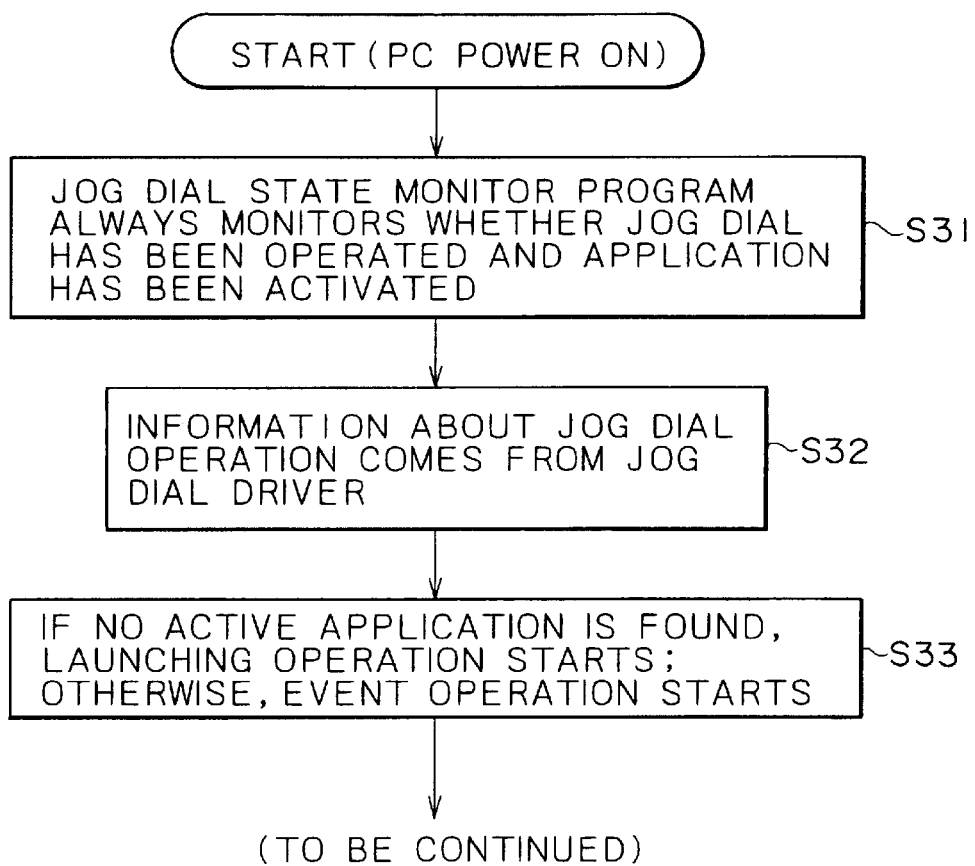

When the power switch 8 has been turned on, the CPU 51 executes the jog dial state monitor program 54C in a sequence shown in FIG. 16.

To be more specific, in step S31, the jog dial state monitor program 54C always monitors whether the jog dial 4 has been operated or not. This program also monitors whether the electronic mail program 54A and other application programs 54F1 through 54Fn have been activated or not.

The jog dial state monitored here is used to monitor by the CPU 51 the processing of the jog dial state monitor program 70E through the jog dial driver 54D. This is substantially the same as the operation described above with reference to FIG. 13.

In step S32, when the information indicative that the jog dial 4 has been operated comes from the jog dial driver 54D, then, in step S33, the CPU 51 checks for any active application program. If no active application program is found, the CPU 51 starts a launching operation. If an active application program is found, the CPU 51 starts an event operation. The launching operation herein denotes the selection of an application program registered and added to a launching list in advance.

In detail, the launching operation functions on condition that there is not currently active application program. The jog dial menu displays the application programs previously registered and added to the launching list. The launching list contains jog-dial-capable application programs.

When a launching operation has been executed, a jog dial menu indicative of a launched state is displayed on the LCD 7. The jog dial menu displays the list of jog-dial-capable application programs which are launched according to the rotation and pressing of the jog dial 4.

For example, as shown in FIG. 12, when the predetermined OS 54E is in the activated state by the CPU 51, assume that there is no activated application program and the user has pressed the jog dial 4 once in the direction of arrow "b" shown in FIG. 3. Then, as described with reference to FIGS. 13 through 15, the jog driver 54D receives the pushed state of the jog dial 4 with the flag status from the I/O register by means of the interrupt operation of step S7 of FIG. 13. The jog dial driver 54D sends the information about the pressing of the jog dial 4 to the jog dial monitor program 54C to be executed by the CPU 51.

Figure 17:
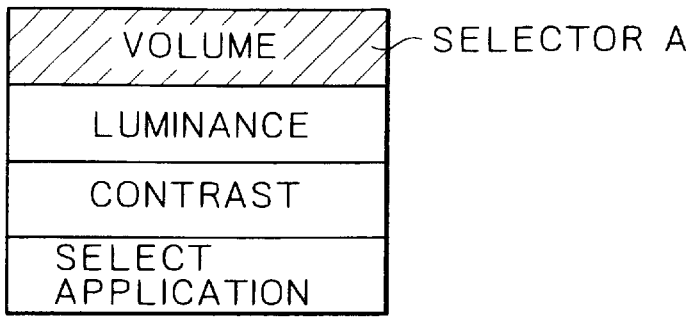
FIG. 17 is a diagram illustrating an example of a display of a jog dial menu.
Figure 18:
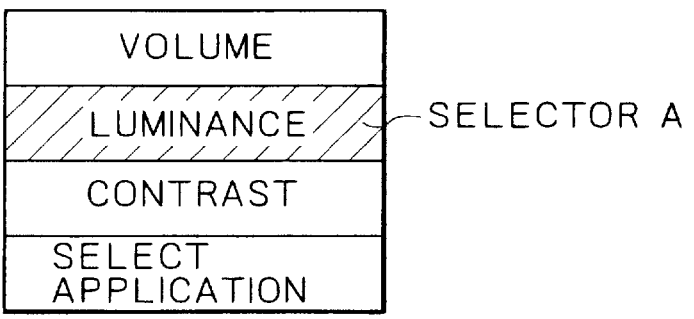
FIG. 18 is a diagram illustrating an example of another display of the jog dial menu.

Then, the CPU 51 starts listed jog-dial-capable application programs such as adjusting the volume of the speaker 65, adjusting the luminance and contrast of the LCD 7, and selecting application programs for example, upon which a jog dial menu as shown in FIG. 17 is displayed on the LCD 7 on the display unit 3 shown in FIG. 1. This jog dial menu displays the menu items ("Volume," "Luminance," "Contrast," and "Select Application") corresponding to the processing such as adjusting the luminance and contrast of the LCD 7, and selecting application programs. In the above-mentioned example, selector A is located on menu item "Volume" as the initial setting.

Next, when the user rotates the jog dial 4 in the direction of arrow "a" shown in FIG. 3 to move selector A, the embedded controller 68 performs computation described above with reference to FIG. 14 according to the jog dial state monitor program 70E and sends the obtained amount of change to the jog dial driver 54D to be executed by the CPU 51.

Then, the jog dial driver 54D sends the information about the operation of the jog dial 4 to the jog dial state monitor program 54C. In response, the CPU 51 moves selector A to the menu item representing the processing that the user wants to execute. For example, when the jog dial menu shown in FIG. 17 is displayed on the LCD 7 (in the state in which selector A is placed on menu item "Volume"), if the user rotates the jog dial 4 in the direction of arrow "a" downward shown in FIG. 3 by a predetermined amount (or a predetermined angle), selector A moves to menu item "Luminance." If the user rotates the jog dial 4 further downward, selector A moves to menu item "Select Application" as shown in FIG. 19.

Figure 20:
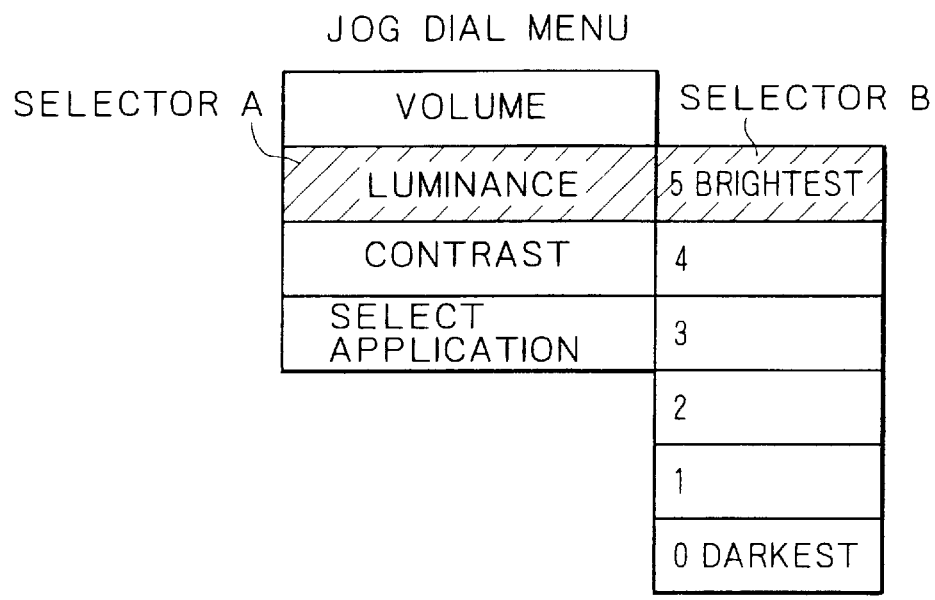
FIG. 20 is a diagram illustrating an example of a display of a sub menu.

When selector A has moved to the desired menu item, the user presses the jog dial 4 in the direction of arrow "b" shown in FIG. 3. This operation lets a sub menu corresponding to the selected menu item "Luminance" display as shown in FIG. 20, for example, if selector A is placed on menu item "Luminance." In this example, the six sub menu items are "5" (brightest) through "0" (darkest). Then, the amount of change in the rotary operation of the jog dial 4 performed by the user is obtained by the embedded controller 68. The obtained value is sent to the jog dial driver 54D. The jog dial operation is further monitored by the jog dial state monitor program 54C, thereby moving selector B.

Figure 19:
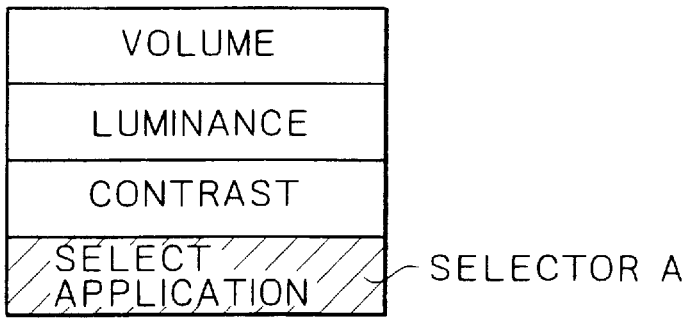
FIG. 19 is a diagram illustrating an example of still another display of the jog dial menu.
Figure 21:
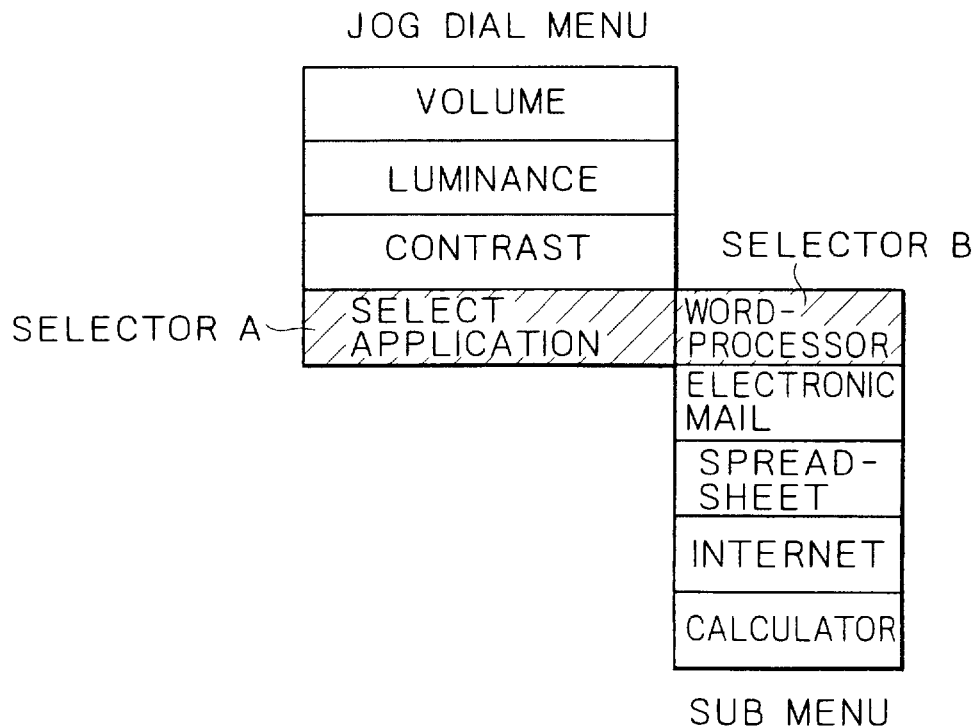
FIG. 21 is a diagram illustrating an example of another display of the sub menu.

If selector A is displayed on menu item "Select Application" as shown in FIG. 19 for example, the sub menu corresponding to "Select Application" is displayed as shown in FIG. 21 by the selecting operation executed by the user. In this example, this sub menu displays "Wordprocessor" for starting a wordprocessor application program, "Electronic mail" for starting an electronic mail program, "Spreadsheet" for starting a spreadsheet program, "Internet" for starting an Internet program, and "Calculator" for starting a calculator program. It should be noted that, in this example, selector B for the sub menu is placed on the top item in the initial state.

Next, the user rotates the jog dial 4 to move selector B to the desired sub menu item and presses the jog dial 4 to select this sub menu item. The sub menu item indicated by selector B is selected and the corresponding processing is executed. For example, referring to FIG. 20, if "3" from the sub menu item is selected, the luminance corresponding to the degree set for this sub menu item is set to the LCD 7. If sub menu item "Internet" is selected in the example shown in FIG. 21, an Internet program (for example, a Web browser) is activated.

Figure 22:
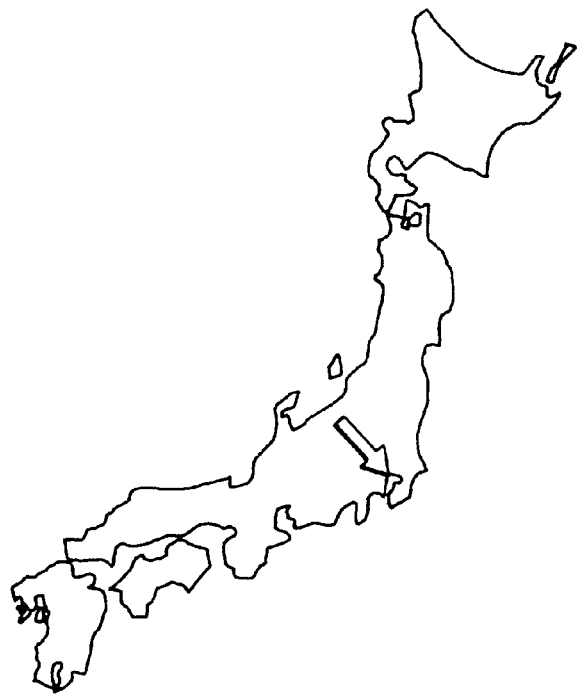
FIG. 22 is a diagram illustrating an example of a display displayed by a map display application program.
Figure 23:
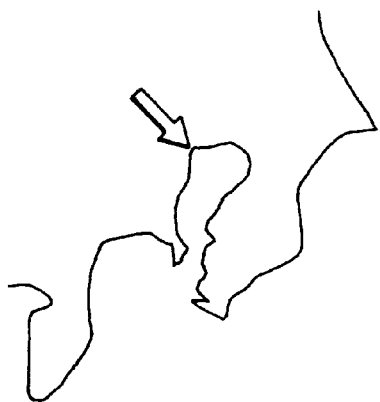
FIG. 23 is a diagram illustrating an example of another display displayed by the map display application program.

The following describes the case in which, when the power switch 8 is turned on, the CPU 51 executes the jog dial state monitor program 54C and an active application program is found in step S33 shown in FIG. 16. This is the above-mentioned event operation started by the CPU 51. The active application program must be jog-dial-capable. To be more specific, this sort of program is a predetermined application program having image display capability. In this example, it is assumed that a map of Japan shown in FIG. 22 is displayed on the LCD 7. When the user rotates the jog dial 4 with the map displayed on the LCD 7, the image is enlarged around the location indicated by the pointer as shown in FIG. 23.

When the user rotates the jog dial 4 in the reverse direction against the above-mentioned direction, the image shrinks (returns to the original size). Thus, in any predetermined application program having the jog-dial-capable image display capability, the displayed image can be zoomed in (shrunk) or out (enlarged) by the rotation of the jog dial 4.

Figure 24:
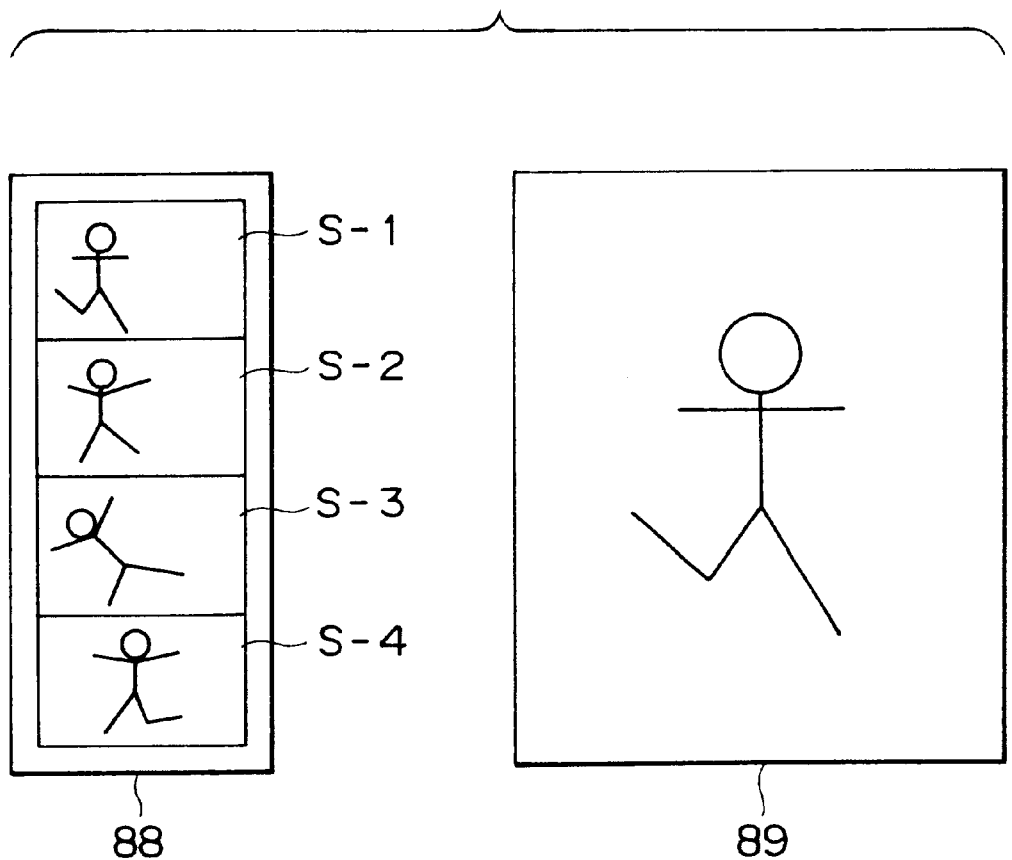
FIG. 24 is a diagram illustrating an example of a display displayed by an edit screen displaying application program.

The following describes the operation of the jog dial 4 to be executed when a jog-dial-capable application program having a motion picture editing capability. In this example, it is assumed that an edit screen as shown FIG. 24 is displayed on the LCD 7 by such an application program.

The edit screen is composed of a display section 88 (to the left of the screen) and a display section 89 (to the right of the screen). The display section 88 shows four time-sequential image frames S-1 through S-4 (hereafter simply referred to as image frame S if it is not necessary to make distinction between the image frames S-1 through S-4) among still images constituting a motion picture. The display section 89 shows one of the image frames S shown in the display section 88, being selected by pushing the jog dial 4. In this example, the selected image frame S is displayed in the display section 89 allowing to be edited in a predetermined manner.

With the edit screen displayed on the LCD 7, the user rotates the jog dial 4 to feed forward or backward image frames S, displaying a desired image frame S in the display section 88. When the desired image frame S is displayed in the display section 88 (in this case, when the desired image frame S is displayed at the top of the display section 88), the user pushes the jog dial 4 for selection. The image frame S displayed at the top of he display section 88 is then selected and displayed in the display section 89. This makes it ready for the user to edit the image frame S in the display section 89.

Figure 25:
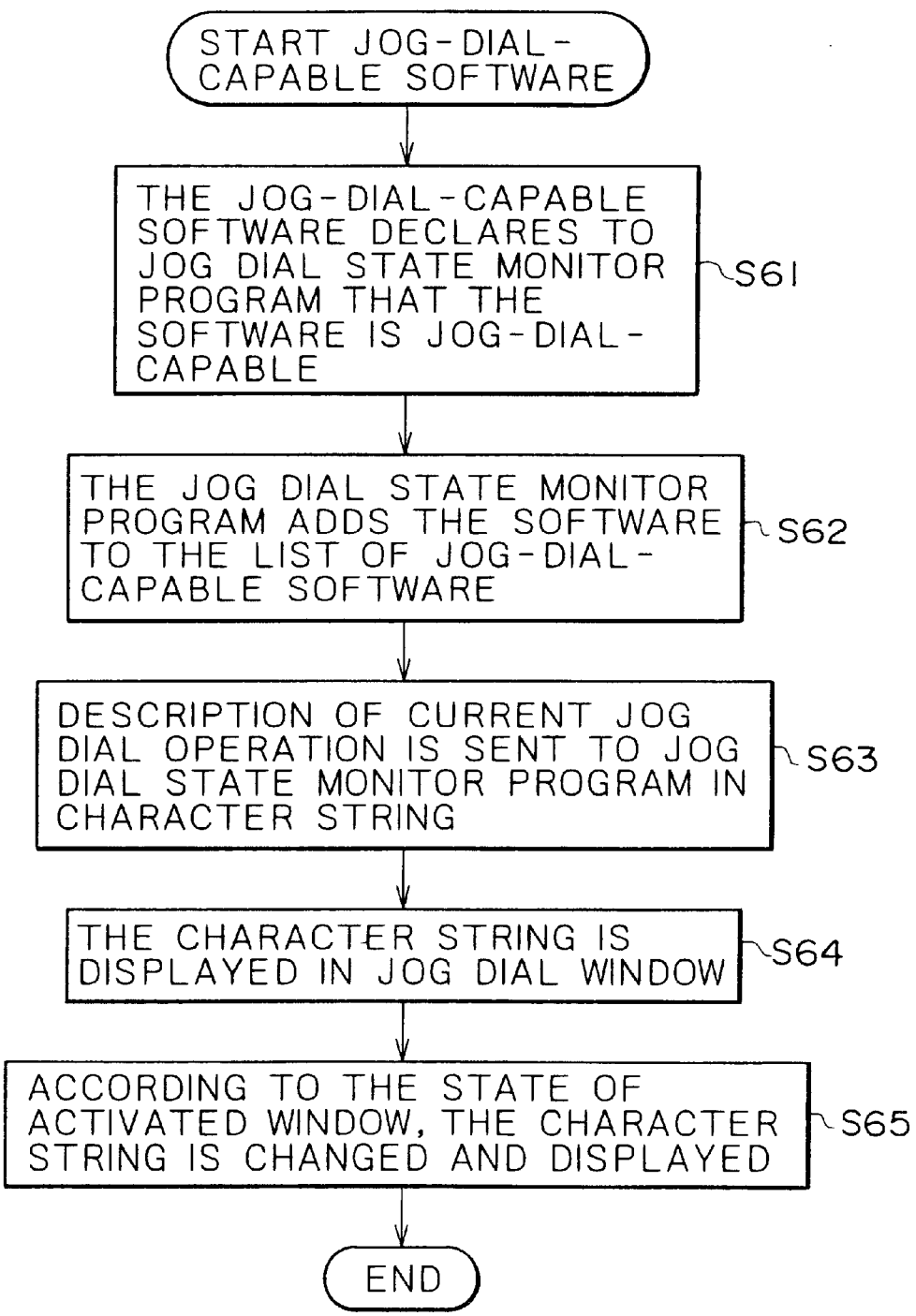
FIG. 25 is a flowchart indicative of the notification processing to be executed by a jog-dial-capable application program on the jog dial state monitor program executed by the CPU.

The above-mentioned application programs practiced as embodiments of the present invention are all jog-dial-capable. However, the application programs stored in the HDD 67 and loaded into the RAM 54 upon completion of the activation processing these programs are not always jog-dial-capable. For example, the application program 54F3 shown in FIG. 12 is not jog-dial-capable. The jog-dial processing to be assigned by the CPU to jog-dial-capable application is different from that assigned to jog-dial-incapable application. Hence, the jog-dial-capable application programs inform of themselves as being jog-dial-capable in advance to the jog dial state monitor program 54C that is executed by the CPU 51 in a procedure shown in FIG. 25.

First, in step S61, an application program declares to the jog dial state monitor program 54C that the application program is jog-dial-capable. In step S62, the jog dial state monitor program 54C adds this application program to the list of job-dial-capable application program.

Then, although not described in the above-mentioned example, the jog dial menu may be displayed in a manner inherent in the application program to be supplied to the user as the form of a jog dial guide.

Figure 26:
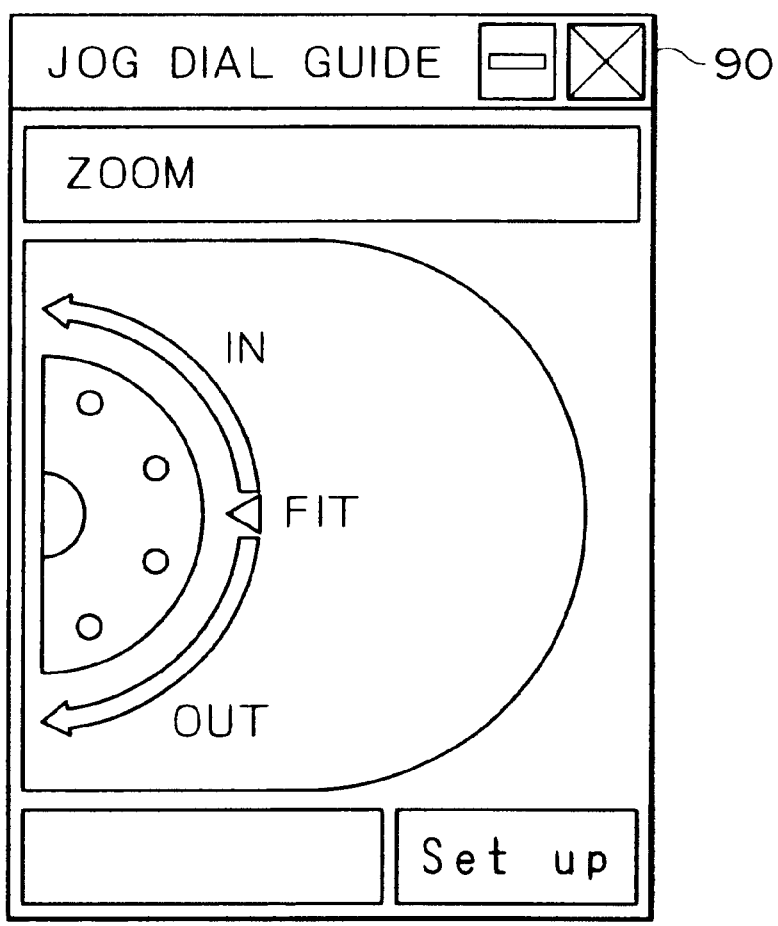
FIG. 26 is a diagram illustrating a specific example in which the display of the jog dial menu is inherent in application program.

To be more specific, in step S63, the jog-dial-capable application program notifies the jog dial state monitor program 54C of the description of the jog dial operation in the current state by means of a character string. In step S64, a jog dial window 90 shown in FIG. 26 is displayed, in which characters such as "Jog dial guide," "Zoom," "In," "Fit" and "Out" are displayed.

In step S65, the jog-dial-capable application program changes character strings according to the state of the activated window to update the list of a jog dial state monitor program 54C.

Thus, when the jog-dial-capable application program is active, the display in the jog dial window 90 denotes the description in character string how this application program will be operated according to the jog dial operation.

The following describes some embodiments of the jog-dial-capable application program.

Figure 27:
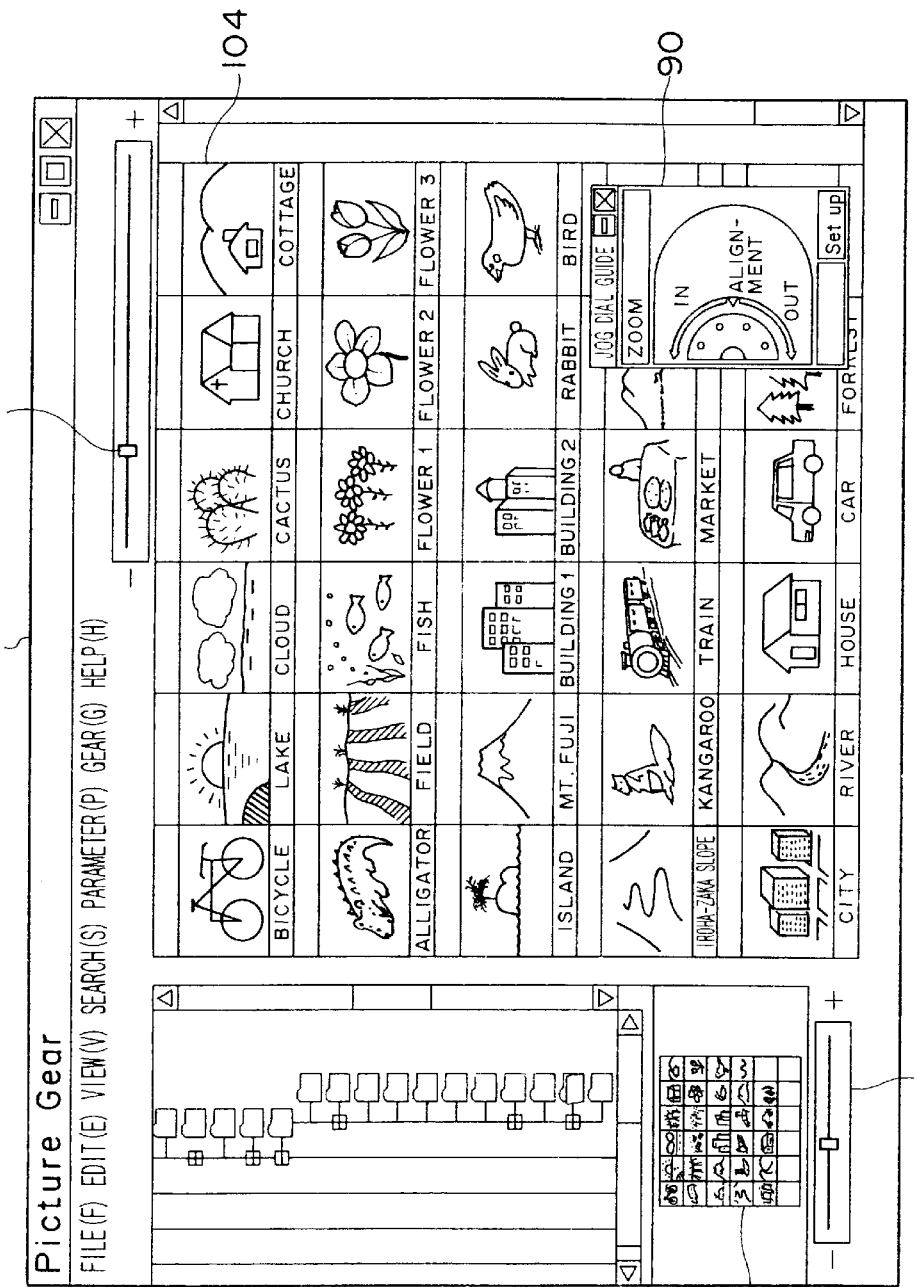
FIG. 27 is a diagram illustrating an example of a display of a first embodiment of the jog-dial-capable application program.

A first embodiment is PictureGear (trademark), which is an image viewer and an image manipulating tool. Details of PictureGear are found on the Internet at the URL; http://vaio.sony.co.jp/software/PictureGear/index.html. PictureGear is the software capable of managing in a centralized manner still and motion pictures stored on various removable information storage media including hard disc, floppy disc, MO (Magneto Optical) disc, PC card, and the other card-type memory media. The images can be displayed in a list by executing a predetermined operation, allowing the user to visually confirm desired images at a glance. The image manipulating capability allows the user to create 360-degree panorama images and labels attached with photographs. This capability also allows the user to create HTML (Hyper Text Markup Language) albums that can be viewed by a WWW (World Wide Web) browser. FIG. 27 shows a PictureGear window 101. In the figure, an image display section 104 lists many images in a given zoomed degree (this display is referred to as sheet view display). To view all of these images, the user can view another image display section 105 in which all images are displayed in a higher zoomed-in rate, in shrunk state. The image display section 104 can also display only one image selected from among those displayed in the sheet view display. The image display sections 104 and 105 can be zoomed in and out by means of slide-bars 102 and 103 respectively, which have zoom in/out gages. The slide-bar 102 having the zoom in/out gages allows the user to quickly zoom in or out the images in sheet view or a single selected image with the zooming ratio in a range of 12.5% through 800%, for example. Then, by application of the present invention, the user executes this zoom in/out operation by rotating the jog dial 4 (for scrolling) and pushing the same. In procedure, the jog dial window 90 is displayed at a predetermined position, at the lower right corner of the window 101 for example, when PictureGear has been activated as shown in FIG. 27. At this moment, what will happen by the current jog dial operation is displayed to the user through the processing of steps S63 and S64 shown in FIG. 25. Namely, in sheet view display, the jog dial window 90 displays that zoom in/out operations can be executed by rotating the jog dial 4 and listed images can be aligned in match with the window 104 by pushing the jog dial 4. In single image display, the jog dial window 90 displays that zoom in/out operations can be executed by rotating the jog dial 4 and the zoomed image can be fit to the size of the window 104 by pushing the jog dial 4.

Figure 28:
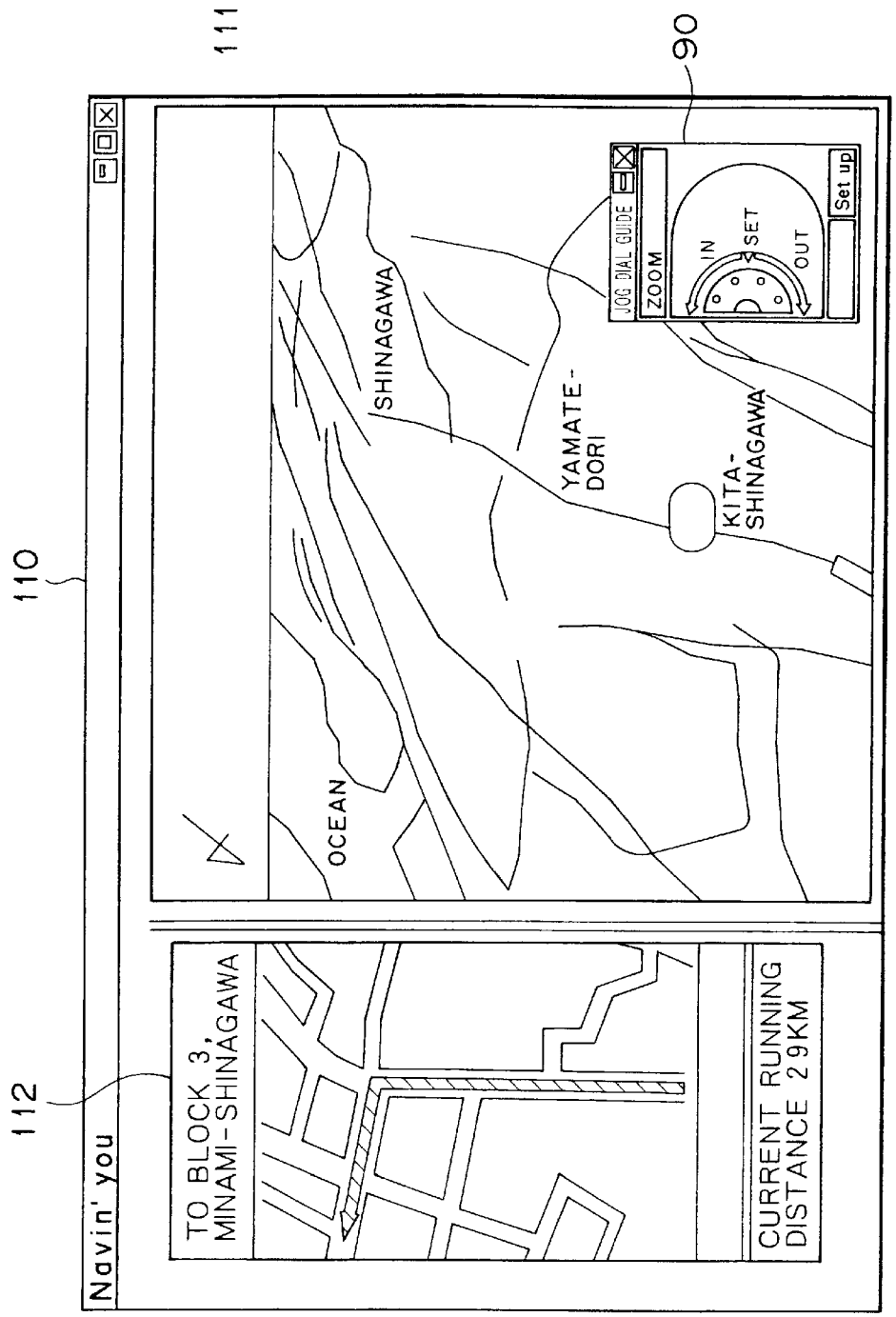
FIG. 28 is a diagram illustrating an example of a display of a second embodiment of the jog-dial-capable application program.

A second embodiment of the present invention is Navin'You (trademark), a tool for displaying the map of a current location obtained on the basis of GPS (Global Positioning System). Details of the second embodiment are found on the Internet at URL http://vaio.sony.co.jp/software/NaginYou/top.html. Navin'You is the software that allows the user to operate maps in a realistic view with a sense of distance, such that crossings, road signs and traffic signals approach toward the user as if the user looks down the map from the sky as the map is scrolled, in addition to the related art map display in which maps are shown in a two-dimensional, flat, top view manner. A predetermined operation allows the user to freely adjust the height of map navigating flight, so to speak. Further, simply moving the pointer in the advancing direction allows the user to navigate the map, as if the user were piloting an airplane. FIG. 28 shows a Navin'You window 110. In the Navin'You window 110, a three-dimensional display section 111 and a two-dimensional display section 112 are displayed in the window 110. The jog dial window 90 is also displayed at the lower right corner for example of the window 110. The jog dial window 90 in this case displays what will happen when the user executes the jog dial 4, through the processing of step S63 and S64 shown in FIG. 25. To be more specific, the jog dial window 90 displays that the user can zoom in/out the map by rotating the jog dial 4 and a setting screen that affects the map navigating operation by pushing the jog dial 4, and clear the setting screen by pushing the jog dial 4 again while displaying the setting screen through the processing of step S65.

Figure 29:
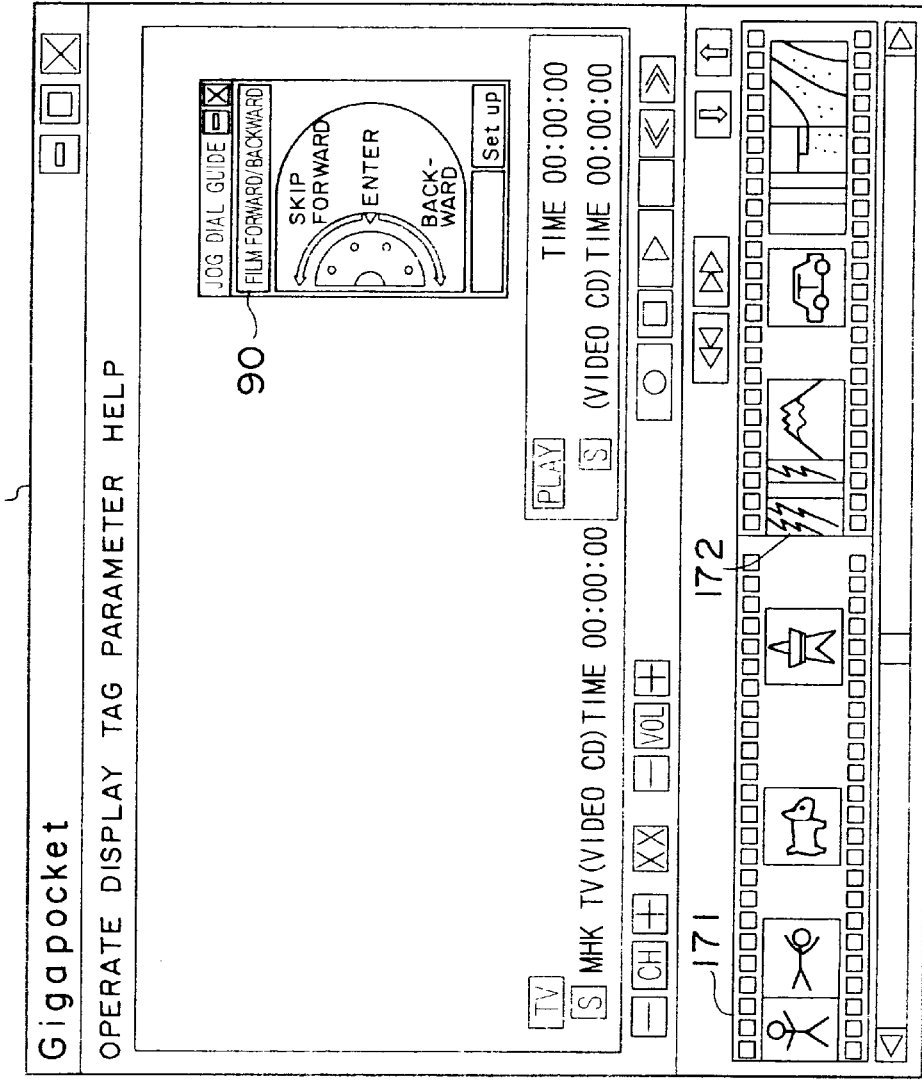
FIG. 29 is a diagram illustrating an example of a display of a third embodiment of the jog-dial-capable application program.

A third embodiment of the present invention is GigaPokect (trademark) that allows the user to record, reproduce, and manage television programs and video images for example in high image quality with a comfortable operation. Details of the third embodiment are found on the Internet at URL http://vaio.sony.co.jp/software/GigaPocket/recorder.html. The Giga video recorder of GigaPocket allows the user to record and reproduce, in high image quality of MPEG2 (Moving Pictures Expert Group 2), television programs received through the TV tuner installed on the MPEG2 realtime encoder board of a personal computer such as Vaio (trademark) or video images captured through an external input terminal. The video images can be recorded on the hard disk drive of the personal computer for reproduction in a random access method. Therefore, the user can reproduce a recorded scene while recording subsequent scenes or reproduce a previously recorded file not associated with the video currently being recorded. The Giga video recorder automatically detects the turn between scenes and stores a thumbnail picture. At the time of reproduction, the thumbnail picture is horizontally scrolled in synchronization with reproduction. This processing is executed by the film roll capability. This capability allows the user to feed the film forward. When the user specifies a desired point, the user can reproduce the film from that point. Therefore, the user can quickly jump to any desired scene to efficiently view it. GigaPocket is an embodiment of the technology associated with AV (Audio Video) contents recording/reproducing processing disclosed by the applicant hereof in the specification and drawings of Japanese Patent Application Laid-open No. Hei 11-117267. FIG. 29 shows an embodied GigaPocket window 115. The figure shows a state in which AV contents have been reproduced after activation of GigaPocket and plural still pictures stored in still picture data files are displayed. A still picture display window 171 displays, as thumbnail pictures having a predetermined size, still pictures (providing turns between scenes) stored in still picture data files. The horizontal axis of the still picture display window 171 corresponds to the time axis of the images to be reproduced. A position indicated by a current position indicator gage 172 corresponds to the current point of time, namely the image currently being reproduced. The left side of the figure indicates a predetermined point of time in past (at which images have already been reproduced), or a point of time retrospective by a predetermined time corresponding to the distance from the position of the current position indicator gage. The right side of the figure indicates a predetermined point of time in future (images will be reproduced afterward) corresponding to the distance from the current position indicator gage 172. A thumbnail picture is arranged at the position corresponding to the point of time of the turn between scenes and is displayed in the still picture display window 171. If the turn between scenes takes place in a short time, the thumbnail pictures are displayed in an overlapped manner. As going through display of images to be reproduced (namely, with the lapse of time), the display position of thumbnail picture moves from right to left in the figure.

By dragging a thumbnail picture, the thumbnail picture thus displayed in the still picture display window 171 is scrolled separately from the image being reproduced. The distance between thumbnail pictures always reflects the period of time between the turns between scenes and remains unchanged. By the thumbnail pictures shown in the still picture display window 171, the user can quickly recognize the turns between scenes in a predetermined range, viewing a desired scene immediately. Consequently, the above-mentioned film roll capability can be associated with the rotation and push operations of the jog dial 4 to feed the film portion forward or backward by rotation and determine the operation by pushing the jog dial 4. Thus, the user can feed the film portion forward or backward, quickly determine a desired reproduction point, and start the reproduction from that point. This capability allows the user to quickly jump to a desired scene, enhancing the efficiency of video viewing.

The following outlines other embodied jog-dial-capable application programs (fourth through tenth embodiments) and their operations. The fourth embodiment is SmartWrite (trademark), a simplified wordprocessor program. With SmartWrite, rotating the jog dial 4 allows the user to scroll a document up and down on the display and pushing the jog dial 4 allows the user to jump up to the top of the document. These capabilities are displayed in the jog dial window.

The fifth embodiment is SmartScript (trademark) editor, which is an application automatic execution tool by means of script. With SmartScript, rotating the jog dial 4 allows the user to advance execution of procedures and pushing the jog dial 4 at reproduction or recording allows the user to temporarily stop the execution. These capabilities are displayed in the jog dial window.

The sixth embodiment is DV Gate Motion (trademark), which is a digital video reproduction and edit tool. With DV Gate Motion, rotating the jog dial 4 allows the user to get back a frame feed operation in temporarily stopped state and pushing the jog dial 4 allows the user to perform a marking operation. These capabilities are displayed in the jog dial window.

The seventh embodiment is Smart Capture (trademark), which is a shooting tool of still picture and motion picture for a digital video camera. With Smart Capture, the capabilities to be executed by rotation and pushing of the jog dial 4 are different in each of a finder screen, a still viewer, and a movie player. This is because character strings can be changed and displayed according to the state of the window activated by executing the processing of step S65 shown in FIG. 25. On the finder screen, rotating the jog dial 4 allows the user to set effect levels. For example, this level setting includes attachment of white noise. On the still viewer, rotating the jog dial 4 allows the user to select a still picture to be displayed and pushing the jog dial 4 allows the user to start an electronic mail program (or a mailer). The mailer is effective when a still picture is used as an attached file. On the movie player, rotating the jog dial 4 allows the user to select a motion picture frame to be displayed and pushing the jog dial 4 allows the user to start the same mailer as mentioned above.

The eighth embodiment is MediaBar (trademark), which is a tool for music-associated reproduction. With MediaBar, rotating the jog dial 4 allows the user to select the reproduction of a next or previous piece of music and pushing the jog dial 4 allows the user to temporarily stop the reproduction.

The ninth embodiment is a jog dial browser, which is a tool for browsing folders using a jog dial. Rotating the jog dial 4 allows the user to scroll a list up and down and pushing the jog dial 4 allows the user, if a folder has been selected, to display a file list belonging to thereunder and, if data or a program has been selected, to execute the same. If cancel has been selected, the execution is ended. If return has been selected, the file list for a file one level up is displayed.

The tenth embodiment includes, as hot key capabilities, the capabilities of changing levels and determining a changed level in luminance adjustment, volume adjustment, mute adjustment, LCD/VGA output setting, and LCD/TV output setting.

In each of the above-mentioned embodiments, predetermined processings can be related to the rotation and push operations of the jog dial 4 and the related operations can be executed.

The recording media for providing the computer programs for having the jog dial 4 execute the above-mentioned processing include recording media such as magnetic disc, CD-ROM, and solid memory, communications media such as network and communications satellite, and various interfaces such as router and modem for transferring the computer programs provided by these media. The information providing medium as used herein is a wide concept that includes all of the above-mentioned media and interfaces.

As described and according to the invention, the rotation and pushing operations of a jog dial facilitate the execution of predetermined processing such as selecting two or more menus for example.

While the preferred embodiments of the present invention have been described using specific terms, such description is for illustrative purposes only, and it is to be understood that changes and variations may be made without departing from the spirit or scope of the appended claims.

What is claimed is:

1. An information processing apparatus comprising:
    depressing means for activating, enabling and executing jog-capable applications;
    rotational means for selecting a jog-capable application from a plurality of jog-capable applications, for selecting a jog-capable application operation from a plurality of jog-capable application operations, and for generating left and right detection signals that are supplied to left and right signal counters, respectively; and
    monitoring means for monitoring a rotational distance of said rotational means by polling the amount of change that occurs in the left and right signal counters,
    whereby a list of jog-capable applications is activated by depressing the depressing means,
    whereby a jog-capable application is selected from the list of jog-capable applications by rotating the rotating means,
    whereby the selected jog-capable application is enabled by depressing the depressing means,
    whereby after a jog-capable application is enabled, a list of jog-capable application operation is activated,
    whereby a jog-capable application operation is selected from the list of jog-capable application operations by rotating the rotating means, and
    whereby the selected jog-capable application operation is executed by depressing the depressing means.

2. The information processing apparatus as claimed in claim 1, further comprising:
    control means for monitoring states of the depressing means and the rotational means and executing predetermined processing in response to the depressing means and the rotational means with a power switch turned on.

3. The information processing apparatus as-claimed in claim 1, further comprising:
    control means for monitoring states of the depressing means and the rotational means and executing predetermined processing in response to the depressing means and the rotational means with a power switch turned on and an operating system activated.

4. An information processing apparatus comprising:
    operating means for operating a jog-capable application by having a first operating block corresponding to a rotational operation and a second operating block corresponding to a depressing operation, and for generating left and right detection signals that are supplied to left and right signal counters, respectively; and control means for monitoring an operating state of the operating means and for monitoring a rotational distance of said rotational operation by polling the amount of change that occurs in the left and right signal counters, whereby a list of jog-capable applications is activated by the depressing operation, whereby a jog-capable application is selected from the list of jog-capable applications by the rotational operation, whereby the selected jog-capable application is enabled by the depressing operation, whereby after a jog-capable application is enabled, a list of jog-capable application operations is activated, whereby a jog-capable application operation is selected from the list of jog-capable application operations by the rotational operation, and whereby the selected jog-capable application operation is executed by the depressing operation.

5. The information processing apparatus as claimed in claim 4, wherein said control means, with a power switch turned on, guides operable computer programs in a hierarchical manner on the basis of a notification received from the selected jog-capable application.

6. The information processing apparatus as claimed in claim 4, wherein said control means, with a power switch turned on and an operating system activated, activates a guide corresponding the rotational operation and the depressing operation on the basis of a notification received from the selected jog-capable application.

7. An information processing method comprising the steps of:

depressing step for activating, enabling and executing jog-capable applications;

rotating step for selecting a jog-capable application from a plurality of jog-capable applications and for selecting a jog-capable application operation from a plurality of jog-capable application operations;

generating step for generating left and right detection signals that are supplied to left and right signal counters, respectively; and monitoring step for monitoring a rotational distance of said rotational step by polling the amount of change that occurs in the left and right signal counters, whereby a list of jog-capable applications is activated by the depressing step whereby a jog-capable application is selected from the list of jog-capable applications by the rotating step, whereby the selected jog-capable application is enabled by the depressing step, whereby after a jog-capable application is enabled, a list of jog-capable application operations is activated, whereby a jog-capable application operation is selected from the list of jog-capable application operations by the rotating step, and whereby the selected jog-capable application operation is executed by the depressing step.

8. The information processing method as claimed in claim 7, further comprising the steps of:

monitoring, with the power switch turned on, states of the jog dial, and executing predetermined processing corresponding to jog dial.

9. The information processing method as claimed in claim 7, further comprising the steps of:

monitoring, with a power switch turned on and an operating system activated, states of the jog dial; and executing predetermined processing corresponding to the jog dial.

10. An information processing method comprising the steps of:

operating a jog-capable application by having a first operating block corresponding to a rotational operation and a second operating block corresponding to a depressing operation;

generating left and right detection signals that are supplied to left and right signal counters, respectively;

monitoring an operating state of the operating means; and monitoring a rotational distance of said rotational operation by polling the amount of change that occurs in the left and right signal counters, whereby a list of jog-capable applications is activated by the depressing operation, whereby a jog-capable application is selected from the list of jog-capable applications by the rotational operation, whereby the selected jog-capable application is enabled by the depressing operation, whereby after a jog-capable application is enabled, a list of jog-capable application operations is activated, whereby a jog-capable application operation is selected from the list of jog-capable application operations by the rotational operation, and whereby the selected jog-capable application operation is executed by the depressing operation.

11. The information processing method as claimed in claim 10, wherein the first operating block and the second operating block, with a power switch turned on, guides operable computer programs in a hierarchical manner on the basis of a notification received from the selected jog-capable application.

12. The information processing method as claimed in claim 10, wherein the first operating block and the second operating block, with a power switch turned on and an operating system activated, activates a guide corresponding to the rotating operation and the depressing operation on the basis of a notification received from the selected jog-capable application.

13. An information providing medium for making an information processing apparatus execute a computer program by depressing and rotating a jog dial, whereby said jog dial generates left and right detection signals which are supplied to left and right signal counters, respectively, whereby said information processing apparatus monitors a rotational distance of said jog dial by polling the amount of change that occurs in the left and right signal counters, whereby a jog dial menu containing a list of jog-capable applications is activated by depressing the jog dial, a jog-capable application is selected from the jog dial menu by rotating the jog dial, and the selected jog-capable application is enabled by depressing the jog dial, and whereby after a jog-capable application is selected, a jog dial operation menu containing operations of the selected jog-capable application is activated by depressing the jog dial, an operation from the jog dial operation menu is selected by rotating the jog dial, and the selected operation is executed by depressing the jog dial.

14. An information providing medium for making an information processing apparatus execute a computer program having a first operating block corresponding to a rotational operation and a second operating block corresponding to a depressing operation and monitoring an operating state of the rotational operation and the depressing operation, whereby said rotational operation generates left and right detection signals which are supplied to left and right signal counters, respectively, whereby said information processing apparatus monitors a rotational distance of said rotational operation by polling the amount of change that occurs in the left and right signal counters, whereby a jog dial menu containing a list of jog-capable applications is activated by the depressing operation, a jog-capable application is selected from the jog dial menu by the rotational operation, and the selected jog-capable application is enabled by the depressing operation, and whereby after a jog-capable application is selected, a jog dial operation menu containing operations of the selected jog-capable application is activated by the depressing operation, an operation from the jog dial operation menu is selected by the rotational operation, and the selected operation is executed by the depressing operation.

* * * * *